(12) United States Patent
Baduge et al.

(10) Patent No.: US 9,456,034 B2
(45) Date of Patent: Sep. 27, 2016

(54) COMMUNICATION TERMINAL, COMMUNICATION CONTROL METHOD, AND PROGRAM

(75) Inventors: Thilmee Malinda Baduge, Osaka (JP); Eiichi Muramoto, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 317 days.

(21) Appl. No.: 13/814,367

(22) PCT Filed: Jun. 5, 2012

(86) PCT No.: PCT/JP2012/003683
§ 371 (c)(1),
(2), (4) Date: Feb. 5, 2013

(87) PCT Pub. No.: WO2012/169175
PCT Pub. Date: Dec. 13, 2012

(65) Prior Publication Data
US 2013/0159475 A1    Jun. 20, 2013

(30) Foreign Application Priority Data

Jun. 9, 2011 (JP) ................................. 2011-129452

(51) Int. Cl.
*H04L 29/08* (2006.01)
*G06F 15/16* (2006.01)
(Continued)

(52) U.S. Cl.
CPC ....... *H04L 67/1095* (2013.01); *H04L 65/1059* (2013.01); *H04N 21/6405* (2013.01); *H04N 21/64738* (2013.01)

(58) Field of Classification Search
CPC ........... H04L 67/1095; H04L 65/1059; H04L 12/185; H04L 12/1868; H04L 12/1854; H04L 69/329; H04L 45/16; H04L 49/15; H04L 49/35; H04L 45/00; H04L 45/24; H04N 21/64738; H04N 21/6405
USPC ........................................................ 709/219
See application file for complete search history.

(56) References Cited

U.S. PATENT DOCUMENTS 7,031,701 B1 * 4/2006 Ahmavaara ............ H04B 7/022
370/233
8,599,851 B2   12/2013 Amir et al.
(Continued)

FOREIGN PATENT DOCUMENTS

JP    2003-235027    8/2003
JP    2004-135062    4/2004
(Continued)

OTHER PUBLICATIONS

International Search Report issued Jul. 3, 2012 in International (PCT) Application No. PCT/JP2012/003683.
(Continued)

*Primary Examiner* — Dhairya A Patel
*Assistant Examiner* — Clifton Houston
(74) *Attorney, Agent, or Firm* — Wenderoth, Lind & Ponack, L.L.P.

(57) ABSTRACT

A communication terminal capable of seamless reproduction of stream data even when structure of an ALM tree changes during the reproduction of stream data includes a control unit which causes a reproduction unit to start reproduction of a stream data packet at a time point which is later than a predetermined time point by a total of all delay times corresponding to a communication path from the communication terminal to a leaf terminal. The delay times are obtained by an obtainment unit.

6 Claims, 20 Drawing Sheets

(51) Int. Cl.
*H04L 29/06* (2006.01)
*H04N 21/6405* (2011.01)
*H04N 21/647* (2011.01)

(56) References Cited

U.S. PATENT DOCUMENTS

| | | | |
|---|---|---|---|
| 8,750,103 B2 | 6/2014 | Baduge et al. | |
| 2001/0004352 A1* | 6/2001 | Watanabe | H04L 12/6418 370/252 |
| 2005/0208979 A1* | 9/2005 | Kim | H04N 7/152 455/566 |
| 2007/0010898 A1* | 1/2007 | Hosek | G05B 19/4148 700/2 |
| 2007/0086366 A1* | 4/2007 | Luo | H04L 12/1827 370/260 |
| 2007/0165639 A1* | 7/2007 | Tajima | H04L 12/185 370/392 |
| 2009/0213777 A1* | 8/2009 | Ogawa | H04H 20/40 370/312 |
| 2009/0274160 A1* | 11/2009 | Yanagihara | H04L 12/1868 370/408 |
| 2010/0030850 A1* | 2/2010 | Onjo | H04L 69/28 709/203 |
| 2010/0250781 A1* | 9/2010 | Matsunaga | H04J 3/0685 709/248 |
| 2010/0260071 A1* | 10/2010 | Lai | H04L 45/22 370/256 |
| 2011/0002334 A1* | 1/2011 | Baduge | H04L 12/185 370/390 |
| 2011/0128958 A1 | 6/2011 | Baduge et al. | |
| 2011/0196918 A1 | 8/2011 | Kkunigita et al. | |
| 2011/0243131 A1 | 10/2011 | Amir et al. | |
| 2012/0158818 A1* | 6/2012 | Baduge | H04L 12/1854 709/201 |
| 2014/0079059 A1 | 3/2014 | Amir et al. | |

FOREIGN PATENT DOCUMENTS

| | | |
|---|---|---|
| JP | 2007-86484 | 4/2007 |
| JP | 2010-109976 | 5/2010 |
| WO | 2010/023828 | 3/2010 |
| WO | 2010/079736 | 7/2010 |
| WO | 2010/115198 | 10/2010 |
| WO | 2010/146798 | 12/2010 |

OTHER PUBLICATIONS

Guang Tan et al., "Improving the Fault Resilience of Overlay Multicast for Media Streaming", IEEE Transactions on Parallel and Distributed Systems, vol. 18, No. 6, Jun. 2007, p. 721-734.

* cited by examiner

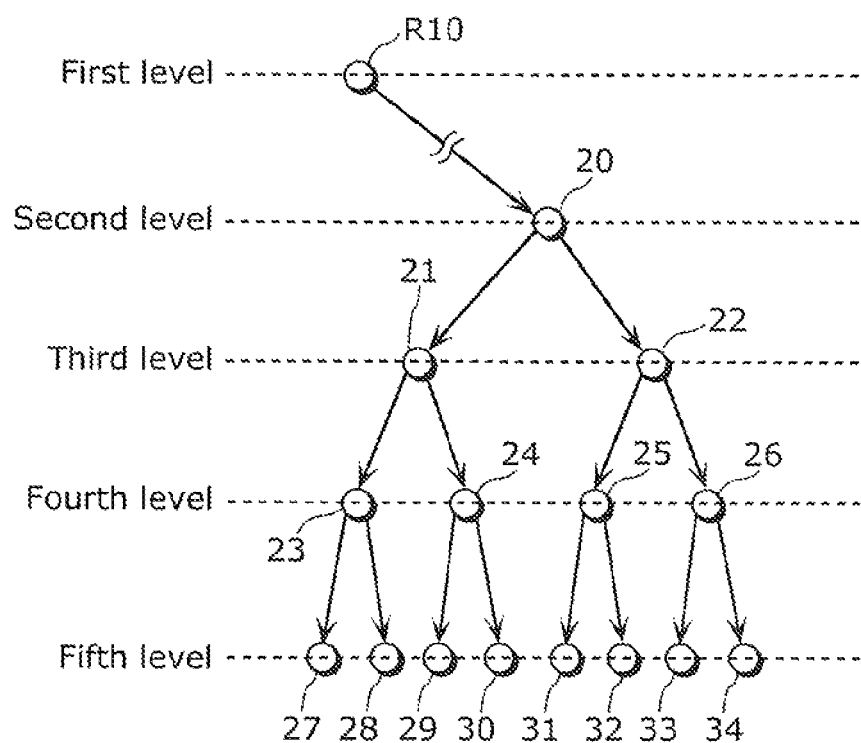

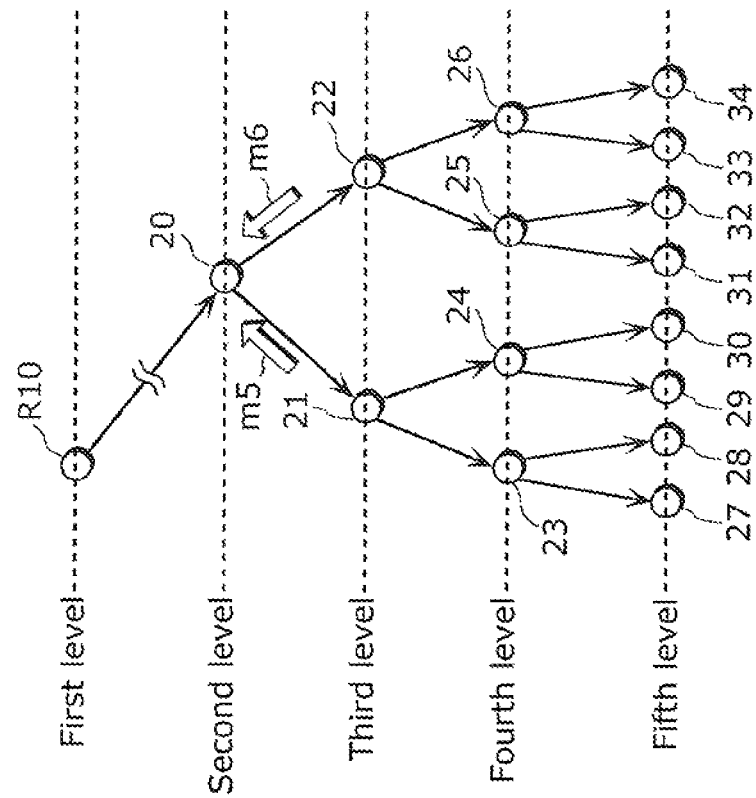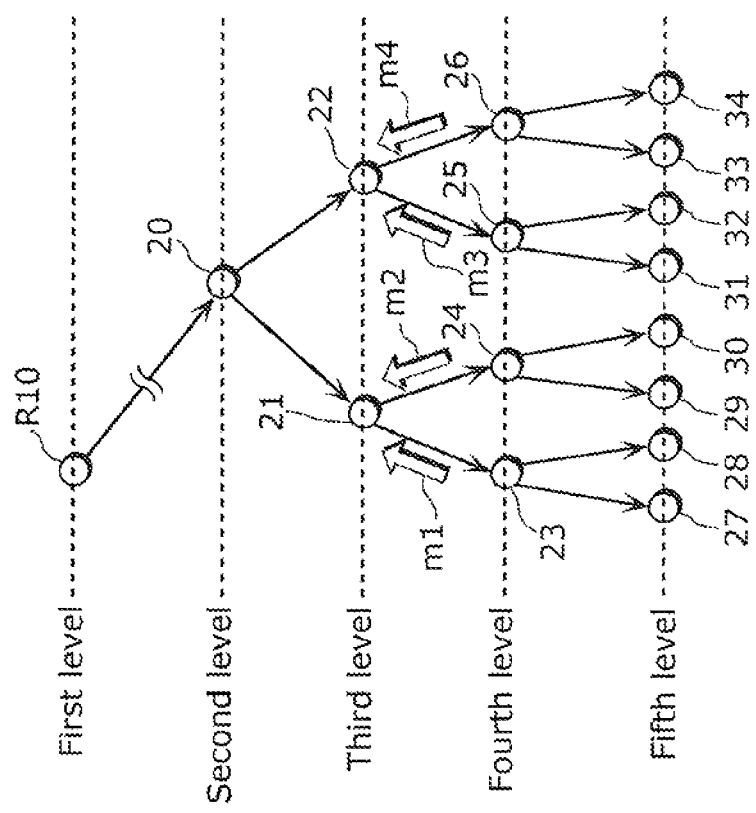
FIG. 9A
FIG. 9B

FIG. 10

| Message ID | Content |
|---|---|
| m1 | DT(23, 28) |
| m2 | DT(24, 29) |
| m3 | DT(25, 32) |
| m4 | DT(26, 33) |
| m5 | DT(24, 29), DT(21, 24) |
| m6 | DT(26, 33), DT(22, 26) |

FIG. 11

| Terminal number | Necessary DT |
|---|---|
| 34 | N/A |
| 33 | N/A |
| 32 | N/A |
| 31 | N/A |
| 30 | N/A |
| 29 | N/A |
| 28 | N/A |
| 27 | N/A |
| 26 | DT(26, 34), DT(26, 33) |
| 25 | DT(25, 32), DT(25, 31) |
| 24 | DT(24, 30), DT(24, 29) |
| 23 | DT(23, 28), DT(23, 27) |
| 22 | DT(26, 34), DT(26, 33), DT(25, 32), DT(25, 31) |
| 21 | DT(24, 30), DT(24, 29), DT(23, 28), DT(23, 27) |

FIG. 14

| Terminal ID | Reproduction delay time |
|---|---|
| P2 | DT(P2, P3) + DT(P3, P4) + DT(P4, P5) + K |
| P3 | DT(P3, P4) + DT(P4, P5) + K |
| P4 | DT(P4, P5) + K |
| P5 | K |

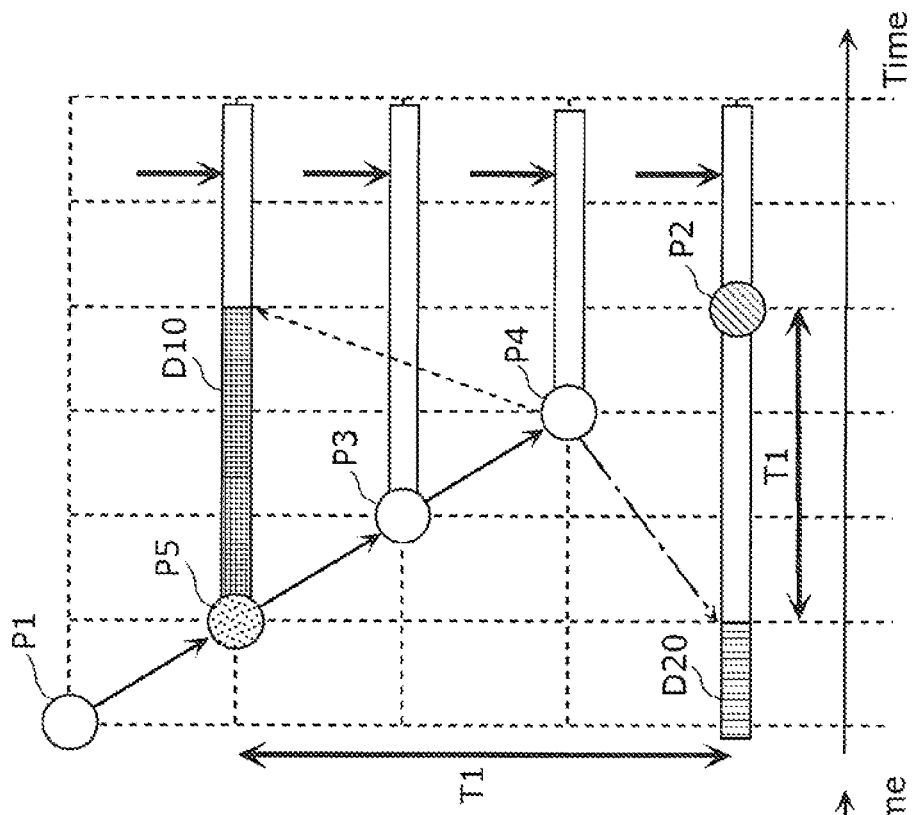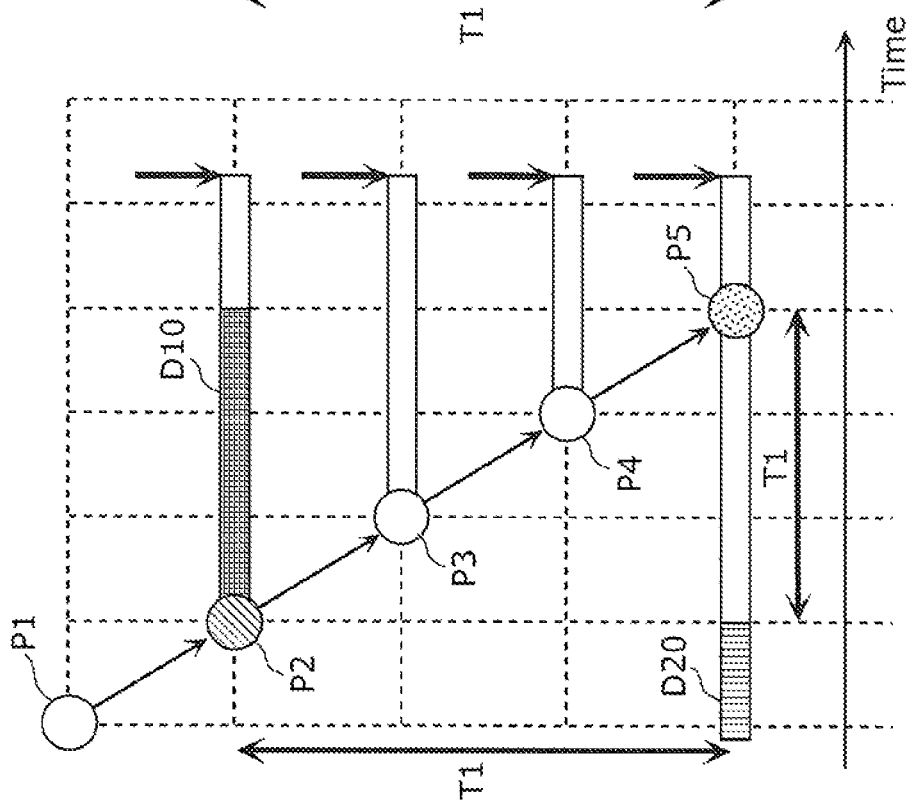

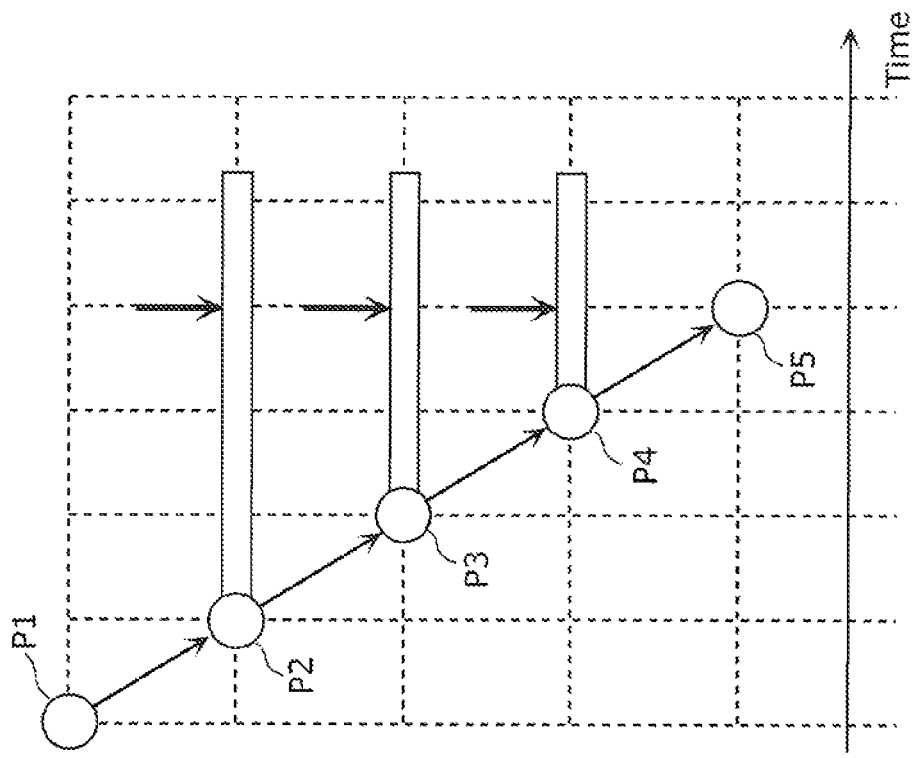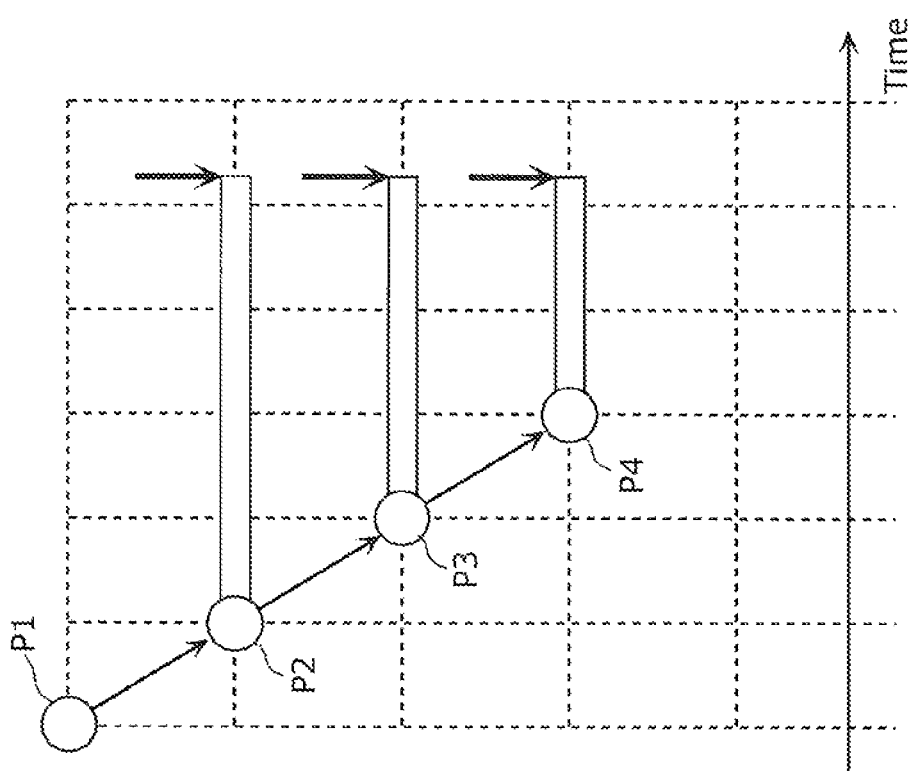

COMMUNICATION TERMINAL, COMMUNICATION CONTROL METHOD, AND PROGRAM

TECHNICAL FIELD

The present invention relates to a communication terminal which is one of terminals included in an application layer multicast (ALM) tree.

BACKGROUND ART

Conventionally, there has been a communication terminal which is one of terminals included in an application layer multicast (ALM) tree, receives stream data packets in sequence from a terminal above the communication terminal in the ALM tree, transfers the received stream data to a terminal below the communication terminal in the ALM tree, stores the received stream data packets, and reproduces the stored stream data packets in sequence at predetermined time points, respectively.

CITATION LIST

Non Patent Literature

[NPL 1] Improving the Fault Resilience of Overlay Multicast for Media Streaming Tan, G.; Jarvis, S. A.; Parallel and Distributed Systems, IEEE Transactions on Volume: 18, Issue: 6 Digital Object Identifier: 10.1109/TPDS2007.1054 Publication Year: 2007, Page(s): 721-734

SUMMARY OF INVENTION

Technical Problem

However, when the structure of an ALM tree is dynamically changed, reproduction of a stream data packet may be started at an improper time point.

Conceived to address the problem, the present invention has an object of providing a communication terminal, a communication control method, and a program any of which enables starting of reproduction of stream data with proper timing even when an ALM tree structure is dynamically changed.

Solution to Problem

In order to achieve the above-described object, the communication terminal according to an aspect of the present invention is any one of the terminals included in an application layer multicast (ALM) tree having a structure which is dynamically changeable during reproduction of stream data. The communication terminal includes: a communication unit configured to receive stream data packets in sequence from a terminal located above the communication terminal in the ALM tree and transmit the received stream data packets to a terminal located below the communication terminal in the ALM tree; a memory unit configured to store the received stream data packets; a reproduction unit configured to reproduce the stream data packets stored in the memory unit in sequence, each of the stream data packets being reproduced at a predetermined time point; an obtainment unit configured to obtain a delay time in data communication between the terminals located below the communication terminal in the ALM tree; and a control unit configured to cause the reproduction unit to start reproduction of each of the stream data packets at a time point which is later than the predetermined time point by a predetermined length of time that is longer than or equal to a total of the delay time obtained by the obtainment unit and corresponding to a communication path from the communication terminal to a leaf terminal corresponding to the communication terminal.

General and specific aspects of the present invention may be implemented using a system, a method, an integrated circuit, a computer program, or a computer-readable recording medium such as a CD-ROM, or any combination of systems, methods, integrated circuits, computer programs, or computer-readable recording media.

Advantageous Effects of Invention

Any of the communication terminal and others according to the present invention enables starting of reproduction of stream data packets with proper timing even when an ALM tree structure is dynamically changed.

BRIEF DESCRIPTION OF DRAWINGS

FIG. 6 is a diagram for illustrating an ALM tree.
FIG. 9A is a first diagram for illustrating transmission of messages.
FIG. 9B is a second diagram for illustrating transmission of messages.
FIG. 10 illustrates an example of the messages.
FIG. 11 is a diagram for illustrating an example of a branch delay necessary for each terminal.
FIG. 14 illustrates exemplary reproduction delay times each corresponding to a terminal.
FIG. 15A is a diagram for illustrating processing which is performed in Variation 1 of Embodiment 1 according to the present invention.
FIG. 15B is a second diagram for illustrating processing which is performed in Variation 1 of Embodiment 1 according to the present invention.
FIG. 18A is a first diagram for illustrating an example of the fifth process.

FIG. 18B is a second diagram for illustrating an example of the fifth process.

DESCRIPTION OF EMBODIMENTS

Underlying Knowledge Forming Basis of the Present Invention

The present invention relates to a method of keeping seamless distribution of stream data via an application layer multicast (ALM) tree.

The inventors have known a method of streaming distribution via an ALM tree as a technique for distributing video data to a plurality of terminals.

Figure 1:
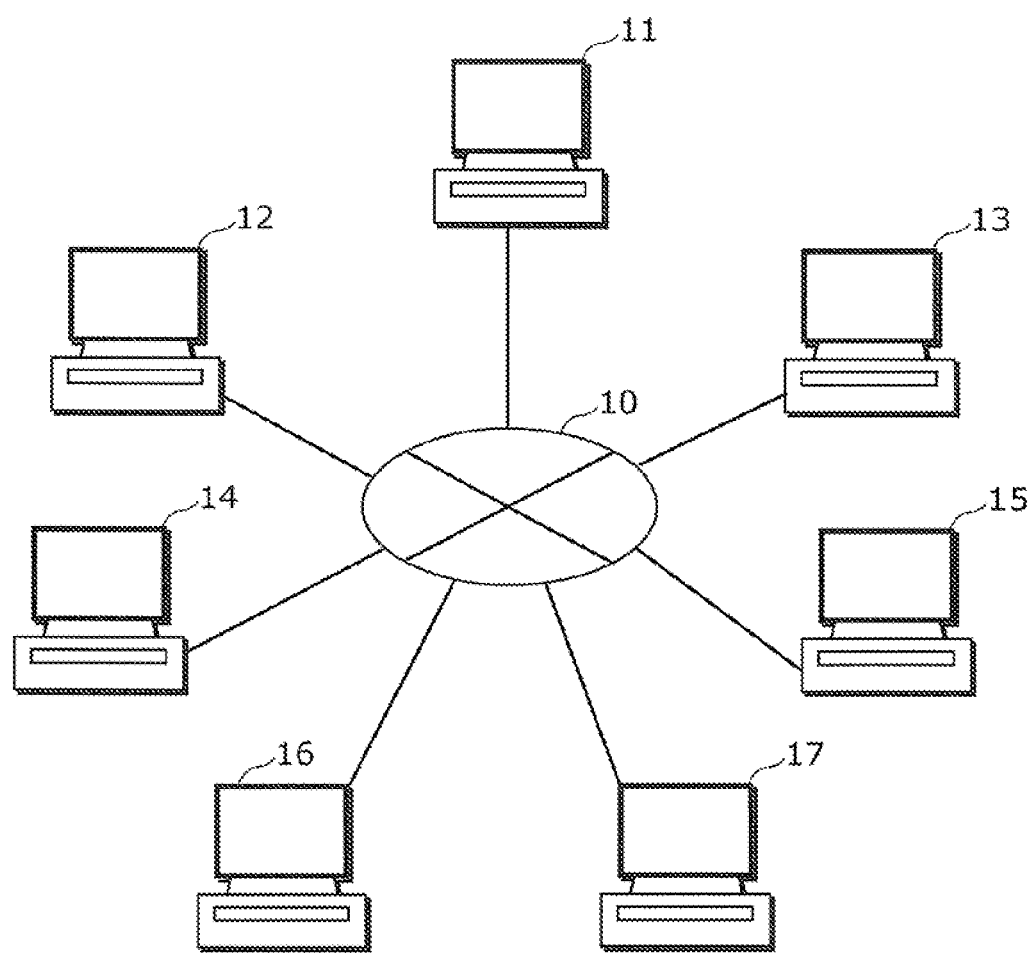
FIG. 1 is a diagram for illustrating an ALM tree.

FIG. 1 is a first diagram for illustrating an overview of the ALM tree.

Figure 2:
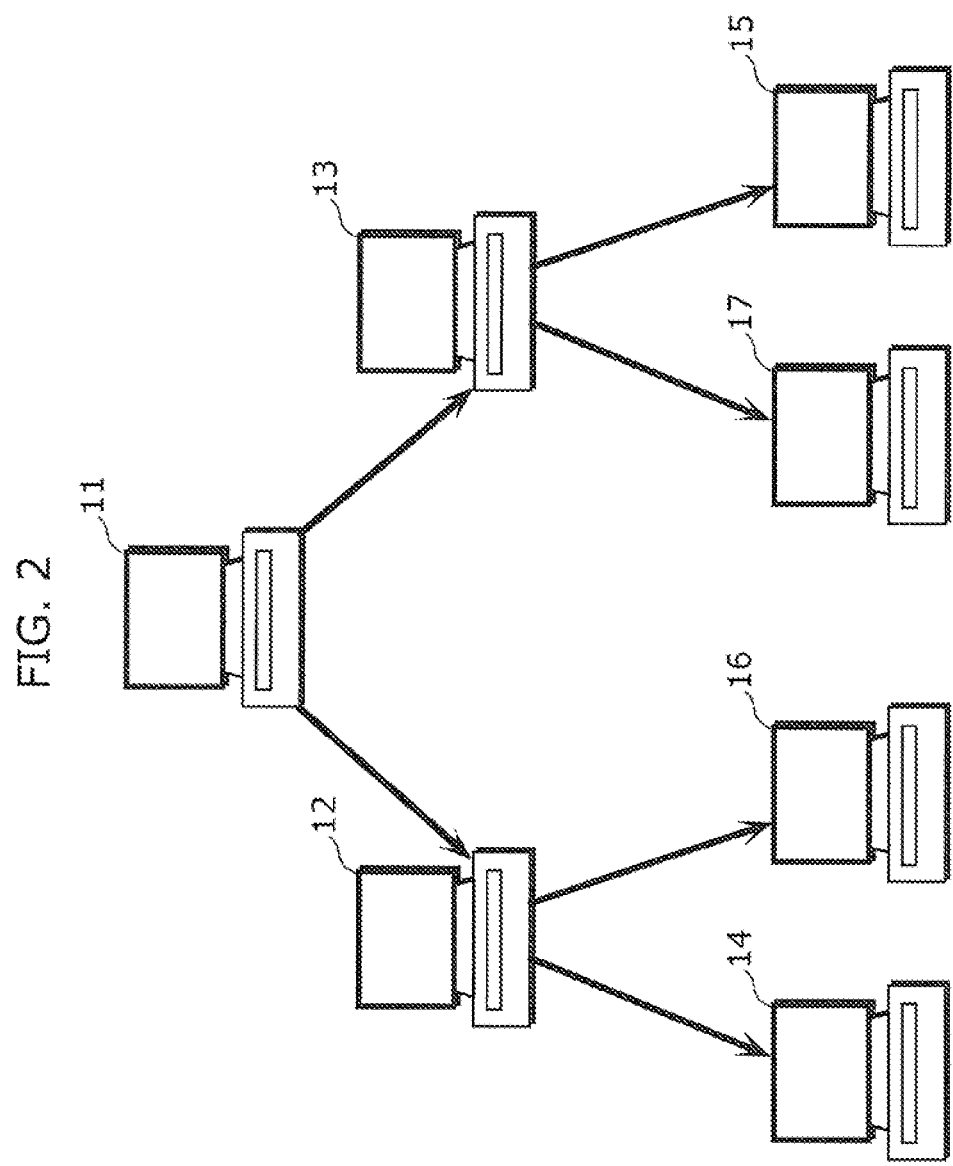
FIG. 2 is a diagram for illustrating an ALM tree.

FIG. 2 is a second diagram for illustrating an overview the ALM tree.

As illustrated in FIG. 1, terminals 11, 12, 13, 14, 15, 16, and 17 are connected to a star communication network 10, such as the Internet or a local area network (LAN).

When, for example, the terminal 11 distributes stream data directly to all the other terminals 12, 13, 14, 15, 16, and 17, the amount of the data may excess the upper limit of bandwidth of the line connected to the terminal 11, and thereby a delay may be caused.

In view of this, a hierarchical logical topology is alternatively used in which the distribution source of stream data, that is, the terminal 11 is at the lop level (or is a root terminal) as illustrated in FIG. 2. In other words, the terminal 11 distributes stream data only to the terminals 12 and 13. The terminals 12 and 13 each reproduce the stream data received from the terminal 11. On the other hand, the terminal 12 distributes the stream data to the terminals 14 and 16 and the terminal 13 distributes the stream data to the terminals 15 and 17.

In this configuration, traffic is balanced across the communication network so that stream data can be distributed to each terminal without (significant) delay.

However, when stream data is distributed via such an ALM tree, the terminals in the ALM tree may need to be dynamically relocated in response to dynamic change in network status between the terminals.

Figure 3:
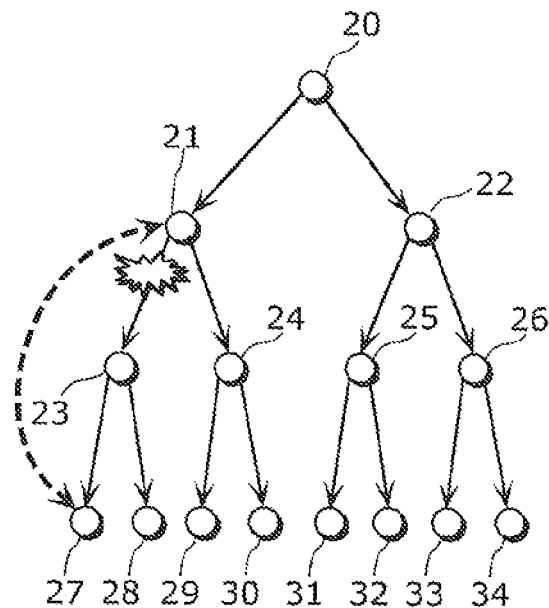
FIG. 3 is a diagram for illustrating change in structure of an ALM tree.

FIG. 3 is a first diagram for illustrating a reason why such relocation is necessary.

As an example, assume that communications between a terminal 21 and a terminal 23 in an ALM tree illustrated in FIG. 3 deteriorate. Possible causes of the deterioration include increase in traffic in the network between the terminal 21 and the terminal 23.

Figure 4:
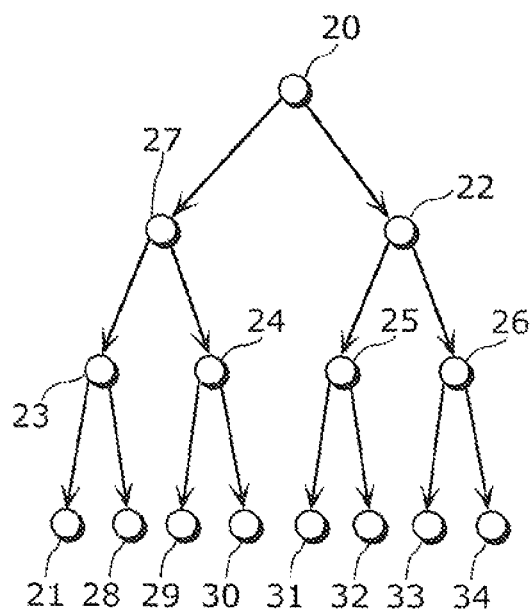
FIG. 4 is a diagram for illustrating change in structure of an ALM tree.

FIG. 4 is a second diagram for illustrating the reason why such relocation is necessary.

When there is such increase in traffic, communication status can be improved by, for example, switching the terminal 21 and the terminal 27 in the ALM tree as illustrated in FIG. 4. In the present description, the switching of terminals means switching (exchanging) of locations of terminals in an ALM tree.

NPL 1 discloses a technique in which a time period having a fixed length is set as an allowable reproduction time for data reproduction by each receiving terminal. The allowable reproduction time is a period of time from storing of data in a buffer to starting of reproduction of the data. However, the technique disclosed in NPL 1 cannot prevent deterioration in communication quality because no actual delay between terminals is taken into consideration for the technique.

Since no actual delay between terminals is taken into consideration, the allowable reproduction time set in NPL 1 may be too short. As a result, loss in video data is not recovered before reproduction, and the disordered video data is reproduced as it is. The allowable reproduction time set in NPL 1 may be too long. This may cause an excessive delay in data reproduction.

On the other hand, there is a problem with switching of terminals in an ALM tree.

The problem is that seamless reproduction of stream data may be impossible due to the length of delay time of data from a root terminal to at least one of the switched terminals. This may cause skipping during video reproduction. The following will describe the problem.

Figure 5A:
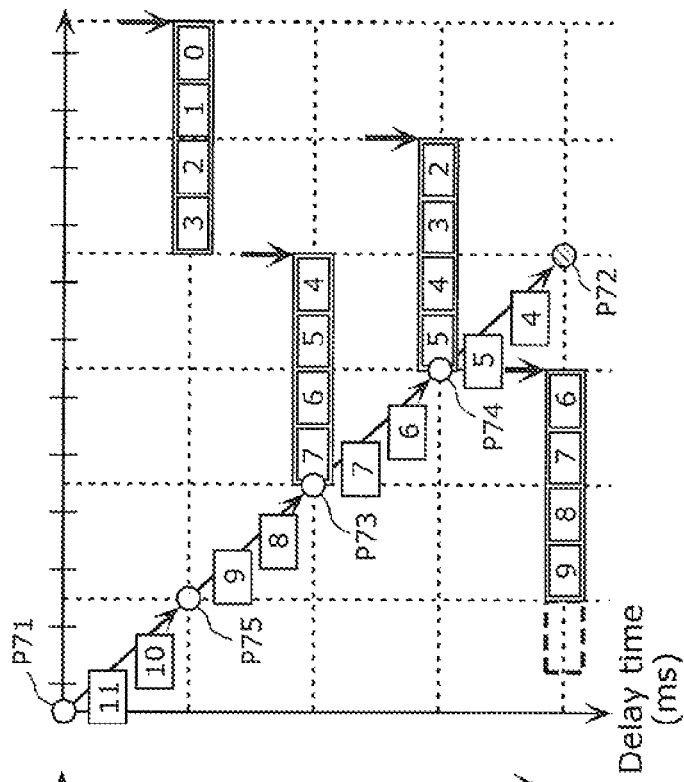
FIG. 5A is a first diagram for illustrating processing which is performed when terminals in an ALM tree are switched.
Figure 5B:
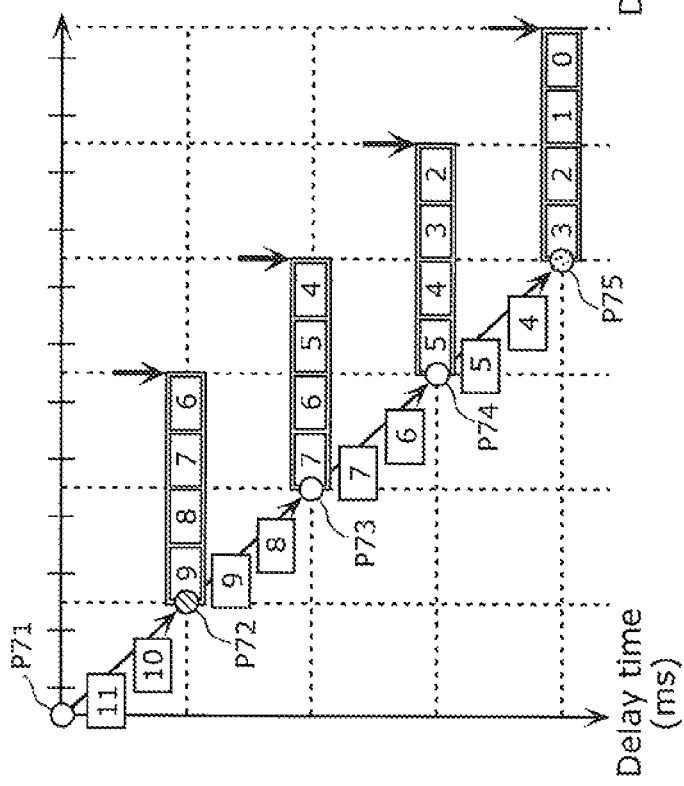
FIG. 5B is a second diagram for illustrating processing which is performed when terminals in an ALM tree are switched.

FIG. 5A and FIG. 5B illustrate processing which is performed when two terminals in an ALM tree are switched. Specifically, FIG. 5A illustrates a status before two terminals are switched. FIG. 5B illustrates statuses of each terminal after the switching of the two terminals.

Each of the FIG. 5A and FIG. 5B includes sequential numbers of 0 to 11. Blocks (squares) with the sequential numbers represent stream data packets. In the following, stream data is also referred to as stream data packets. In the following, the sequential numbers may be also simply referred to as numbers.

Blocks with smaller numbers are older stream data packets. In other words, a block with a smaller number is transmitted from a root terminal at an earlier time.

Terminals P71 to P75 in FIG. 5A and FIG. 5B represent terminals on a path from a root terminal to a leaf terminal in the ALM tree. For example, the terminal P71 is the root terminal. In this case, the terminal P71 is a terminal at the first level of the ALM tree, and the terminals P72 to P75 are at the second to fifth levels, respectively.

Furthermore, each of the terminals P71 to P75 has zero or more numbers in a horizontal row (for example, the terminal P72 in FIG. 5A has numbers 9, 8, 7, and 6 in a row). The zero or more numbers in each horizontal row associated with a terminal represent the sequential numbers (see above) of zero or more stream data packets stored in the buffer of the corresponding terminal. For example, the buffer of the terminal P75 illustrated in FIG. 5A stores four stream data packets numbered 0 to 3.

Assume that a delay time between two adjacent terminals in the ALM tree illustrated in FIG. 5A and FIG. 5B is 100 milliseconds for an example. The two adjacent terminals are, for example, the terminals P72 and P73.

Each of the FIG. 5A and FIG. 5B includes a vertical axis indicating delay time of data from the terminal P71. Referring to FIG. 5A, for example, a stream data packet transmitted from the terminal P71 takes 400 milliseconds 4×100 milliseconds) to arrive at the terminal P75.

In the following, a stream data packet numbered n (n is a natural number) is also referred to as the nth stream data packet. For example, a stream data packet numbered 10 is referred to as the tenth stream data packet.

Assume that the terminal P72 and the terminal P75 are switched as illustrated in FIG. 5A and FIG. 5B in response to deterioration in communications. For example, the buffer of the terminal P72 (FIG. 5B) relocated to the fifth level stores four stream data packets numbered 6 to 9. The terminal P72 therefore needs to receive a stream data packet numbered 10 next (see the terminal P72 in FIG. 5A).

However, the tenth stream data packet arrives at the terminal P72 by way of the terminals P75, P73, and P74 (see FIG. 5B). The tenth stream data packet thus arrives at the terminal P72 with a delay larger than in the case where the terminals are not switched. In other words, there are pairs of two terminals (for example, a pair of the terminals P72 and P73) along the communication path from the terminal P75 to the terminal P72. The arrival of the tenth stream data packet is later by a delay as long as a total of delay times of the three pairs of two terminals (3×100 milliseconds=300 milliseconds). As a result, there is a problem that reproduction of the stream data (such as video) by the terminal P72 is interrupted for the total of the delay times.

The present technique is conceived to solve the problem and has an object of providing a communication terminal or the like which enables seamless reproduction of stream data even when there is a change in a structure of an ALM tree.

The present technique enables seamless reproduction of stream data even when there is a change in the structure of an ALM tree.

A communication terminal according to an aspect of the present invention is one of terminals included in an application layer multicast (ALM) tree (for example, see FIG. 3, FIG. 4, FIG. 6, FIG. 9A, FIG. 9B, and FIG. 2) having a structure dynamically changeable during reproduction of stream data packets. The communication terminal includes: a communication unit (see a communication unit in FIG. 21) configured to receive stream data packets in sequence from a terminal (terminal 20 in FIG. 6) located above the communication terminal (terminal 21) in the ALM tree and transmit the received stream data packets to a terminal (terminals 23 and 24) located below the communication terminal in the ALM tree; a memory unit (see a memory unit 220) configured to store the received stream data packets; a reproduction unit (see a reproduction unit 230) configured to reproduce the stream data packets stored in the memory unit in sequence, each of the stream data packets being reproduced at a predetermined time point; an obtainment unit (see an obtainment unit 240) configured to obtain a delay time in data communication between the terminals located below the communication terminal in the ALM tree; and a control unit (see a control unit 250) configured to cause the reproduction unit to start reproduction of each of the stream data packets at a time point which is later than the predetermined time point by a predetermined length of time (see a period of time T1 in FIG. 13A) that is longer than or equal to a total of the delay time (period of time T1 (≥period of time T2)) obtained by the obtainment unit and corresponding to a communication path from the communication terminal (for example, a terminal P2 in FIG. 13A) to a leaf terminal (terminal P5) corresponding to the communication terminal.

In this aspect, the control unit causes the reproduction unit to start reproduction of each of the stream data packets at a time point which is later than the predetermined time point by a predetermined length of time that is longer than or equal to a total of the delay time obtained by the obtainment unit and corresponding to a communication path from the communication terminal (the terminal including the control unit) to a leaf terminal corresponding to the communication terminal. The predetermined time point is a time at which the reproduction unit reproduces a stream data packet.

With this, the control unit causes the reproduction unit to start reproduction of each of the stream data packets at a time point which is later than the predetermined time point by a predetermined length of time that is longer than or equal to a total of the delay time corresponding to a communication path from the communication terminal to a leaf terminal corresponding to the communication terminal. Accordingly, stream data packets are sequentially received and then uninterruptedly reproduced even when an upper terminal (see the terminal 21) and a lower terminal (terminal 27) of the communication terminal (terminal 23) are switched in response to deterioration of the network status in the communication path to the upper terminal (see the network status in the communication path between the terminals 21 and 23 in FIG. 3) in the ALM tree. As a result, interruption of reproduction of the stream data is prevented. This thereby enables seamless reproduction of stream data even when there is a change in the structure of an ALM tree.

Furthermore, for example, there is a plurality of the leaf terminals corresponding to the communication terminal in the ALM tree (for example, the terminals 27 and 28 in FIG. 9A are leaf terminals corresponding to the terminal 23 in the thirteenth row in FIG. 11), and the total is the largest one of totals each of which is a total of the delay time corresponding to a different one of communication paths from the communication terminal to the leaf terminals (for the case of DT (23, 27) and DT (28, 87) in the thirteenth row in FIG. 11, the total corresponding to the communication path from the terminal 23 to the terminal 28 is the larger).

Furthermore, for example, the communication terminal further includes: a transfer unit configured to, upon detecting switching of a first terminal (see the terminal P5 in FIG. 15A and FIG. 15B) and a second terminal (see the terminal P2) in the ALM tree, change, from the first terminal to the second terminal, a destination of the stream data packets to be transmitted by the communication unit, the first terminal being a terminal among the terminals located below the communication terminal in the ALM tree, and the second terminal being a terminal located above the communication terminal in the ALM tree, and the communication unit is further configured to, when the transfer unit detects the switching of the first terminal and the second terminal, (a) transmit, to the first terminal, a stream data packet which has already been received by the second terminal and follows a newest stream data packet among stream data packets already received by the first terminal (see the arrow from a terminal P4 to data D10), and (h) transmit a new stream data packet to the second terminal after transmitting the stream data packet which follows the newest stream data packet to the first terminal (see the arrow from a terminal P4 to data D20).

In this aspect, when the first terminal and the second terminal are switched, the communication unit transmits, to the first terminal, the stream data packet which has already been received by the second terminal and follows the newest one of stream data packets received by the first terminal. After transmitting the stream data packet which follows the newest stream data packet to the first terminal, the communication unit transmits a new stream data packet to the second terminal.

The communication unit thus transmits, to the first terminal, the stream data packet which follows the newest one of stream data packets already received by the first terminal, so that the stream data packet which follows the newest stream data packet can be delivered to the first terminal after relocation with no additional delay even when a large amount of stream data packets are transmitted from the root terminal of the ALM tree. As a result, it is possible to prevent interruption in reproduction of stream data by the first terminal located above the communication terminal.

Furthermore, for example, the communication terminal further includes an adjustment unit configured to, when the delay time between the terminals below the communication terminal changes (S410, YES in FIG. 19), adjust, depending on the delay time after the changing a difference time, a reproduction time point of the stream data packet which follows the stream data packet currently being reproduced.

In this aspect, n the delay time of a terminal below the communication terminal (the terminal including the adjustment unit) changes, the reproduction time point of the stream data packet which follows the stream data packet currently being reproduced is adjusted depending on the delay time after the changing.

With this, it is possible to cope with the situation in which a terminal below the communication terminal is removed or a terminal (see terminal P5 in FIG. 18B) is newly added below the communication terminal during reproduction of stream data.

Furthermore, for example, the obtainment unit is configured to measure a delay time between the communication terminal and a second terminal which is a child terminal of the communication terminal in the ALM tree, and transmit the measured delay time to a parent terminal of the communication terminal.

Furthermore, for example, the obtainment unit is configured to receive, from the second terminal, a delay time between the second terminal and a third terminal which is a child terminal of the second terminal, and transmit the received delay time to the parent terminal of the communication terminal, the delay time between the second terminal and the third terminal being measured by the second terminal.

Furthermore, for example, the control unit is configured to cause the reproduction unit to start reproduction of each of the stream data packets at a time point which is later than the predetermined time point by a predetermined length of time that is equal to the total of the delay time obtained by the obtainment unit and corresponding to the communication path from the communication terminal to the leaf terminal corresponding to the communication terminal.

In this aspect, the control unit causes the reproduction unit to start reproduction of each of the stream data packets at a time point which is later than the predetermined time point by a predetermined length of time that is equal to the total of the delay time obtained by the obtainment unit and corresponding to the communication path from the communication terminal to the leaf terminal corresponding to the communication terminal. This enables the terminals below the communication terminal to start reproduction of stream data at the same time. As a result, it is possible to maintain synchronous reproduction of stream data by the terminals.

Furthermore, for example, the predetermined time point is a time point which is later than the storing of the stream data packet in the memory unit by a predetermined length of time that is equal to a length of time taken to store the stream data packet in the memory unit.

Furthermore, for example, the stream data includes at least one of video data and audio data.

A communication control method according to an aspect of the present invention is performed by a communication terminal that is one of terminals included in an application layer multicast (ALM) tree having a structure dynamically changeable during reproduction of stream data. The communication terminal includes: a communication unit configured to receive stream data packets in sequence from a terminal located above the communication terminal in the ALM tree and transmit the received stream data packets to a terminal located below the communication terminal in the ALM tree; a memory unit configured to store the received stream data packets; and a reproduction unit configured to reproduce the stream data packets stored in the memory unit in sequence, each of the stream data packets being reproduced at a predetermined time point, and the communication control method includes: obtaining a delay time in data communication between the terminals located below the communication terminal in the ALM tree; and causing the reproduction unit to start reproduction of each of the stream data packets at a time point which is later than the predetermined time point by a predetermined length of time that is longer than or equal to a total of the delay time obtained in the obtaining and corresponding to the communication path from the communication terminal to a leaf terminal corresponding to the communication terminal.

A program according to an aspect of the present invention is executed by a communication terminal that is one of terminals included in an application layer multicast (ALM) tree having structure dynamically changeable during reproduction of stream data. The communication terminal includes: a communication unit configured to receive stream data packets in sequence from a terminal located above the communication terminal in the ALM tree and transmit the received stream data packets to a terminal located below the communication terminal in the ALM tree; a memory unit configured to store the received stream data packets; and a reproduction unit configured to reproduce the stream data packets stored in the memory unit in sequence, each of the stream data packets being reproduced at a predetermined time point, and the program causes a computer to execute: obtaining a delay time in data communication between the terminals located below the communication terminal in the ALM tree; and causing the reproduction unit to start reproduction of each of the stream data packets at a time point which is later than the predetermined time point by a predetermined length of time that is longer than or equal to a total of the delay time obtained in the obtaining and corresponding to the communication path from the communication terminal to a leaf terminal corresponding to the communication terminal.

Hereinafter, embodiments of the present invention are described using the drawings. In the following description, the same constituent elements are denoted by the same reference signs. Such constituent elements have the same name and the same functionality. Therefore, detailed description thereof may be omitted.

Each of the embodiments described below shows a preferable example of the present invention. The values, materials, constituent elements, layout and connection of the constituent elements, steps, and the order of the steps in the embodiments are given not for limiting the present invention but merely for illustrative purposes only. Among the constituent elements in the following exemplary embodiments, constituent elements not recited in any one of the independent claims defining the most generic part of the inventive concept are described as constituent elements included in order to implement a preferred embodiment.

Embodiment 1

An ALM tree is described using FIG. 6.

As illustrated in FIG. 6, an ALM tree is provided for purpose of multicasting at the application layer. An ALM tree has a network structure dynamically changeable during reproduction of stream data. The stream data in the present description refers to data including video data and audio data.

The stream data may include only one of video data and audio data. In other words, the stream data in the present description include at least one of video data and audio data.

An ALM tree includes plural terminals. Each of the plural terminals included in an ALM tree is a communication terminal having a function to communicate with the other terminals. An ALM tree has a hierarchical structure. The ALM tree illustrated in FIG. 6 has a hierarchical structure with five levels for an example. The number of levels of an ALM tree is not limited to five and may be four or six or more.

A terminal R10 is a root terminal. The terminal R10 is a terminal at the first level (topmost level). Terminals 20 to 34 are each at one of the levels. For example, terminals 21 and 22 are at a third level.

Terminals at the lowest level in an ALM tree are referred to leaf terminals. In FIG. 6, terminals at the fifth level are leaf terminals.

Structure of an ALM tree is not limited to the structure illustrated in FIG. 6. For example, the terminal 29 may be omitted. In this case, the terminal 24 has an only child terminal, the terminal 30.

Figure 7:
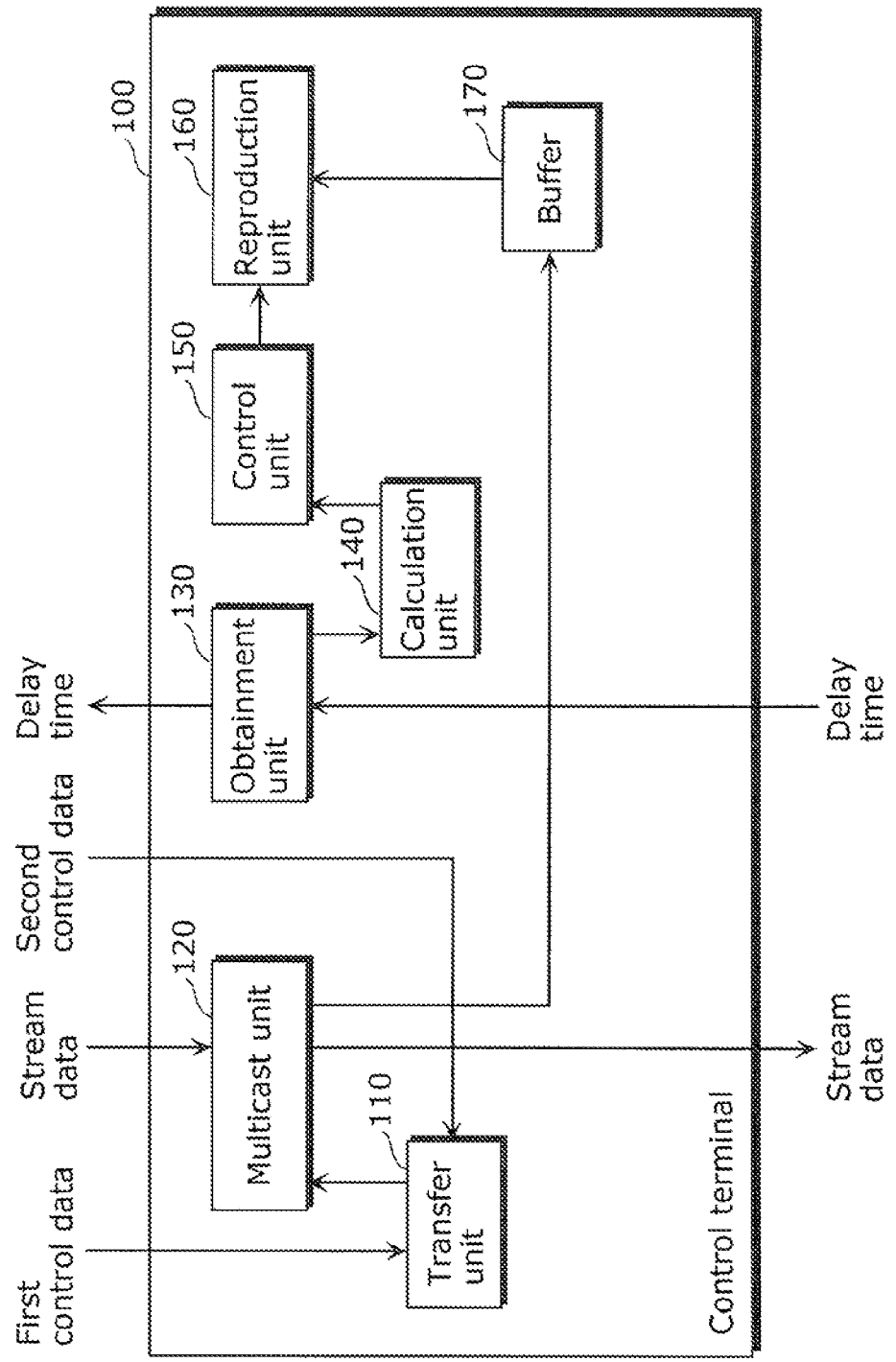
FIG. 7 illustrates a configuration of a communication terminal according to Embodiment 1 of the present invention.

FIG. 7 illustrates a configuration of a communication terminal 100 according to Embodiment 1 of the present invention. The communication terminal 100 is a terminal which is included in an ALM tree but is neither the root terminal nor the leaf terminals of the ALM tree.

The communication terminal 100 includes a transfer unit 110, a multicast unit 120, an obtainment unit 130, a calculation unit 140, a control unit 150, a reproduction unit 160, and a buffer 170.

The buffer 170 is a memory for temporary data storage. In other words, the buffer 170 corresponds to a memory unit.

The transfer unit 110 receives first control data, second control data, and so on transmitted from the root terminal to the communication terminal 100. The first control data is, for example, data for control of structure of the ALM tree. The second control data is, for example, data for instruction for switching two terminals in the ALM tree.

As described above, the switching of terminals means switching (exchanging) of locations of terminals in an ALM tree. In the following, switching of two terminals in an ALM tree is also referred to as a first process.

The transfer unit 110 controls the multicast unit 120 so that the multicast unit 120 changes a destination of data transfer according to the first control data or the second control data.

The multicast unit 120 receives stream data packets sequentially transmitted from a parent terminal. In other words, the multicast unit 120 is a communication unit. In other words, the communication terminal 100 including the communication unit has a terminal has an upper terminal, that is, a parent terminal in the ALM tree. The communication unit sequentially receives stream data packets from such a terminal at a higher level.

Upon receiving each stream data packet, the multicast unit 120 transmits the stream data packet to child terminals. In other words, the multicast unit 120 transmits the received stream data packets to terminals located below the communication terminal 100 including the multicast unit 120 in the ALM tree.

Upon receiving each stream data packet, the multicast unit 120 also stores the stream data packet in the buffer 170. In other words, the buffer 170 functioning as a memory unit stores the stream data packets received sequentially by the multicast unit 120.

The obtainment unit 130 obtains a delay time (branch delay) in data communication between terminals below the communication terminal 100 including the obtainment unit 130 in the ALM tree. This process will be described in detail later.

In other words, the obtainment unit 130 obtains a delay time (branch delay) in data communication between terminals on a communication path from the communication terminal 100 including the obtainment unit 130 to a leaf terminal corresponding to the communication terminal 100 in the ALM tree.

The obtainment unit 130 notifies the parent terminal of the communication terminal 100 of the delay time.

The calculation unit 140 calculates reproduction delay time. Calculation of the reproduction delay time will be described in detail later.

The reproduction unit 160 sequentially reproduces the stream data packets stored in the buffer 170 functioning as a memory unit. The reproduction unit 160 reproduces each of the stream data packets at a predetermined time point The reproduction unit 160 starts reproduction of the nth stream data packet at a time point which is later than the storing of the nth stream data packet in the buffer 170 (n is a natural number) by a delay time K. The delay time K will be described later.

Each of the root terminal and leaf terminals in the ALM tree has a configuration similar to the configuration of the communication terminal 100.

In the following, the length of time necessary for transmission of a data packet from a terminal to a child terminal or a parent terminal of the terminal in an ALM tree is also referred to as a branch delay.

For example, the length of time necessary for transmission of a data packet from the terminal 21 to the terminal 23 which is a child terminal of the terminal 21 is a branch delay. A branch delay equals to half of a round-trip time (RTT). The RTT is the length of time which a data packet takes to make a round trip between two terminals.

The following will describe a process for calculating a branch delay (the process is hereinafter also referred to as a second process).

The second process is performed by a terminal which is included in an ALM tree but is neither the root terminal nor the leaf terminals of the ALM tree. The second process is performed independently of other processes. Each of the leaf terminals in an ALM tree transmits blank messages to its parent terminal at predetermined intervals. The predetermined intervals have a length of five seconds for an example. For example, the terminal 27 in FIG. 6 transmits blank messages to the terminal 23 at predetermined intervals. As with the terminal 27, each of the terminals 28 to 34 also transmits blank messages to its parent terminal.

Assume that the terminal 23 perform the second process for an example.

Figure 8:
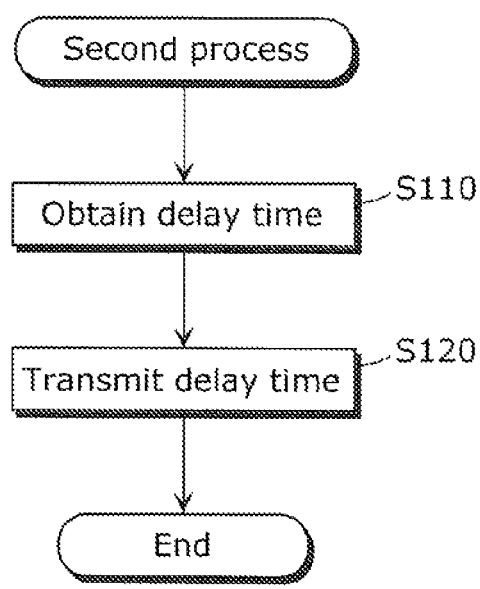
FIG. 8 is a flowchart of the second process.

FIG. 8 is a flowchart of the second process.

Upon receiving a blank message, the obtainment unit 130 measures an RTT between the terminal 23, which includes the obtainment unit 130 and is performing the second process illustrated in FIG. 8, and each of its child terminals (for example, the terminal 27) (S110). The RTT is measured using a known method of measuring an RTT, such as a method in which the Real-time Transport Protocol (to be precise, RTCP) is used.

Then, the obtainment unit 130 calculates, as a branch delay, a value which is half of the calculated RTT. The obtainment unit 130 thus obtains the branch delay as the result of the calculation (S110). The obtainment unit 130 performs the process to calculate a branch delay for each of its child terminals (terminals 27 and 28).

By performing the process in Step S110, the obtainment unit 130 of the terminal 23 obtains a delay time (branch delay) in data communication between each pair of two terminals below the communication terminal 100 including the obtainment unit 130 (terminal 23) in the ALM tree.

In other words, the obtainment unit 130 of the terminal 23 obtains a delay time (branch delay) in data communication between each pair of two terminals on a communication path from the communication terminal 100 including the obtainment unit 130 to its corresponding leaf terminal (for example, terminal 27) in the ALM tree. For example, the two terminals are the terminal 23 and the terminal 27.

In the following, a delay time between two terminals of a terminal x and a terminal y is also expressed as a branch delay DT (x, y). The branch delay DT (x, y) is also expressed as a branch delay DT or a DT for simplicity.

In this case, the obtainment unit 130 of the terminal 23 obtains a DT (23, 27) and a DT (23, 28) by performing the process in Step S110. For example, the DT (23, 28) indicates a branch delay between the terminal 23 and the terminal 28.

Next, the obtainment unit 130 of the terminal 23 transmits a message to its parent terminal (terminal 21) (S120). The message indicates a branch delay having the largest value among all the obtained branch delays (for example, DT (23, 27) between the DT (23, 27) and DT (23, 28)) (S120). In other words, the obtainment unit 130 notifies the parent terminal of the branch delay.

Assume that the value of the DT (23, 28) is larger than the value of the DT (23, 27) for an example. In this example, the obtainment unit 130 notifies the parent terminal of the DT (23, 27).

FIG. 9A and FIG. 9B each illustrate transmission of messages. Referring to FIG. 9A, terminals at the fourth level transmit messages to their parent terminals. Referring to FIG. 9B, terminals at the third level transmit messages to their parent terminal.

FIG. 10 illustrates an example of the messages. In FIG. 10, message IDs ire the first column of the table in FIG. 10 identify messages.

As can be seen from FIG. 9A and FIG. 10, the obtainment unit 130 of the terminal 23 transmits, to the terminal 21, a message m1 which indicates the DT (23, 28) having the larger value. In other words, the terminal 23 notifies its parent terminal 21 of the branch delay DT (23, 28).

The terminals 24 to 26 also each perform the process similar to the above process which the terminal 23 performs.

For an example, a message m2 is transmitted to the terminal 21. For another example, a message m4 is transmitted to the terminal 22.

A terminal which is a child terminal of a terminal but not a leaf terminal in an ALM tree performs the second process as shown below. Assume that the terminal which is a child terminal of a terminal but not a leaf terminal is the terminal 21.

The obtainment unit 130 of the terminal 21 performs the process in Step S110 again to obtain next branch delays (S110). The branch delays are branch delays between the terminal 21 and child terminals of the terminal 21 to which messages are transmitted from the child terminals. The obtainment unit 130 of the terminal 21 performs the process for each of its child terminals (terminal 23 and terminal 24). The obtainment unit 130 thereby obtains a DT (21, 23) and a DT (21, 24).

Next, the obtainment unit 130 calculates, for each of the received messages, a total of a DT indicated in the message (for example, DT (21, 23)) and a branch delay obtained for the corresponding child terminal (terminal 23) which is the sender of the message. The total is also referred to as a first total.

Receiving the message indicating a branch delay from child terminals and performing the process in Step S110, the obtainment unit 130 of the terminal 21 obtains a delay time (branch delay) in data communication between each pair of terminals below the communication terminal 100 including the obtainment unit 130 in the ALM tree. In other words, the obtainment unit 130 of the terminal 21 obtains a delay time (branch delay) in data communication between each pair of two terminals on a communication path from the communication terminal 100 including the obtainment unit 130 to its corresponding leaf terminal (for example, terminal 29) in the ALM tree. Such pairs of two terminals include pairs of terminals one of which is the communication terminal 100 including the obtainment unit 130.

Next, the obtainment unit 130 of the terminal 21 transmits a message to its parent terminal (terminal 20) (S120). The message indicates all DTs used for calculation of the first total having the largest value among all the calculated first totals. In other words, the obtainment unit 130 notifies its parent terminal of DTs (branch delays) by sending the message indicating the DTs.

In other words, the obtainment unit 130 performs the processes in Steps S110 and S120 to measure a delay time between the communication terminal 100 including the obtainment unit 130 and a second terminal which is a child terminal of the communication terminal 100 in the ALM tree and transmit the measured delay time to the parent terminal of the communication terminal 100.

Assume that the terminal 21 performs the second process for an example. In this example, the obtainment unit 130 of the terminal 21 receives a next delay time. This delay time is measured by the second terminal which is a child terminal of the terminal 21, and is measured between the second terminal and a third terminal which is a child terminal of the second terminal. The obtainment unit 130 of the terminal 21 receives the delay time from the second terminal, and transmits the received delay time to the parent terminal of the communication terminal 100 including the obtainment unit 130 that is the terminal 21.

Assume that the terminal 23 transmits a message m1 which indicates a DT (23, 28) to the terminal 21, and the terminal 24 transmits a message m2 which indicates a DT (24, 29) to the terminal 21. Also assume that the total of a DT (21, 24) and the DT (24, 29) is larger than the total of a DT (21, 23) and the DT (23, 28).

In this case, as can be seen from FIG. 96, the obtainment unit 130 of the terminal 21 transmits, to its parent terminal (terminal 20), a message m5 which indicates the DT (21, 24) and the DT (24, 29) which make the larger total.

The terminal 22 also performs the process similar to the above process which the terminal 21 performs. A message m6 is thereby transmitted to the terminal 20.

It should be noted that when two terminals for which a branch delay is calculated includes one terminal and the other terminal, the other terminal need not be a child terminal of the one terminal as in the above-described process. The other terminal of two terminals for which a branch delay is calculated may be the parent terminal of the one terminal.

In the above-described process, a terminal which is a parent terminal of a leaf terminal calculates a branch delay upon receiving a blank message from its child terminal, that is, the leaf terminal. The present invention is not limited to this. The terminal which is the child terminal may calculate branch delays at predetermined intervals without receiving a blank message.

In the above-described process, each of the terminals at the levels notifies its parent terminal only of a branch delay having the largest value among plural obtained branch delays. The present invention is not limited to this. Each terminal may transmit all branch delays which the terminal has obtained to its parent terminal.

In this case, each terminal may obtain branch delays between all pairs of two terminals located below the terminal. In an exemplary configuration, each of the terminals at the levels in the ALM tree illustrated in FIG. 9A transmits all branch delays which the terminal has obtained to its parent terminal.

FIG. 11 is a table illustrating relationships between terminal numbers and necessary DTs.

The table in FIG. 11 shows an example of branch delays (see the second column in FIG. 11) which each terminal having a number in the first column in the table needs to receive in order to calculate a reproduction delay time, which will be described later.

In FIG. 11, the necessary DTs (see the second column) are necessary for the terminal having a number (see the first column) corresponding to the DTs to calculate a reproduction delay time, which will be described later. For example, a DT (25, 32) and a DT (25, 31) are necessary for the terminal 25 (see the eleventh row) to calculate a reproduction delay time, which will be described later.

The method of obtaining a branch delay is not limited to the method in which the location where the process is performed moves upward in the hierarchy as shown in FIG. 9A and FIG. 9B. In an exemplary method, terminals may measure branch delays and broadcast them to all the other terminals.

In another exemplary method, each terminal may measure a branch delay between itself and its parent branch or a branch delay between itself and an adjacent terminal and notify the root terminal of the measured branch delay. Then, the root terminal may notify each terminal of branch delays necessary for the terminal.

Alternatively, the root terminal may notify each terminal of branch delays by multicasting via the ALM tree. Each of the terminals may also obtain branch delays using a method other than these methods.

The following will describe a process for controlling timing for starting reproduction of stream data (the process is hereinafter also referred to as a third process).

The third process is performed by a terminal other than the root terminal included in an ALM tree. The third process is performed independently of other processes. The third process is a communication control method according to Embodiment 1. Assume that the terminal 20 performs the third process for an example.

Figure 12:
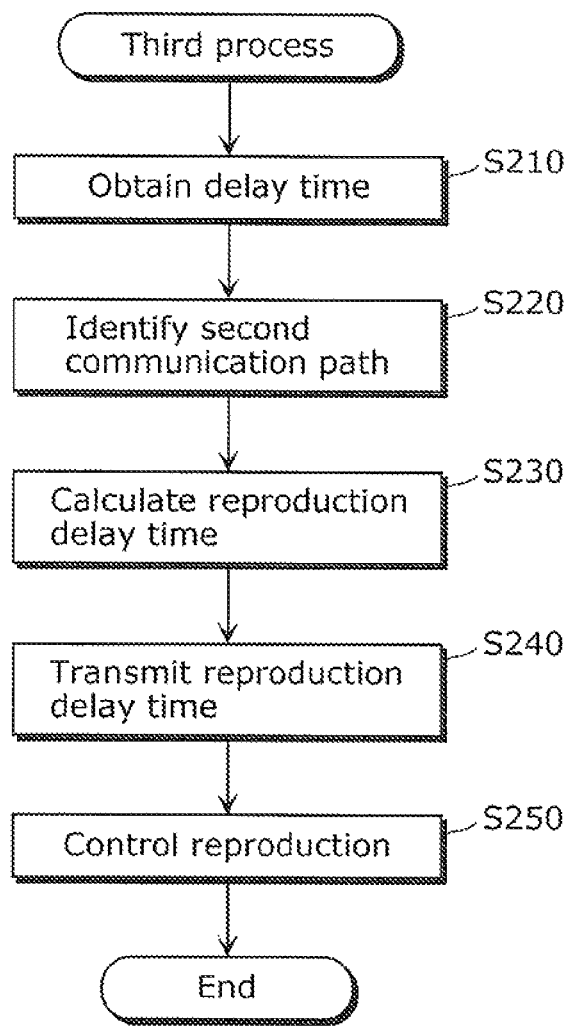
FIG. 12 is a flowchart of the third process.

FIG. 12 is a flowchart of the third process.

The obtainment unit 130 of the terminal 20 performs the process in Step S110 again to obtain a branch delay between the terminal 20 and its child terminal from which messages are transmitted to the terminal including the obtainment unit 130 (that is, the terminal 20) (S210). The obtainment unit 130 of the terminal 20 performs the process for each of its child terminals (terminal 21 and terminal 22). The obtainment unit 130 thereby obtains a DT (20, 21) and a DT (20, 22).

Next, the obtainment unit 130 calculates, for each of the received messages, a total of a DT indicated in the message and the branch delay obtained for the corresponding message. The total is also referred to as a first total.

In the following, the largest one of all calculated first totals is also referred to as a second total.

The obtainment unit 130 transmits, to the calculation unit 140, the largest one of all the calculated first totals (a second total) and all branch delays DTs used for calculation of the second total.

When a terminal has only one child terminal, only one first total is calculated. In this case, the only one first total is a second total.

In the following, a communication path from a terminal to its leaf terminal in an ALM tree is also referred to as a first communication path. The first communication path corresponding to a second total calculated by a terminal is also referred to as a second communication path. Thus, each of the terminals other than the root terminal in an ALM tree has a different second communication path. In other words, an ALM tree includes a plurality of second communication paths.

The calculation unit 140 identifies the second communication path corresponding to a second total (S220).

Assume that the terminal 21 performs the above-described processes to transmit a message m5 (FIG. 9B and FIG. 10) which indicates a DT (24, 29) and a DT (21, 24) to the terminal 20 and that the terminal 22 performs the above-described processes to transmit a message m6 which indicates a DT (26, 33) and a DT (22, 26) to the terminal 20. Also assume that the total of the DT (24, 29), DT (21, 24), and DT (20, 21) is larger than the total of the DT (26, 33), DT (22, 26), and DT (20, 22).

In this case, the obtainment unit 130 transmits, to the calculation unit 140, a second total which is calculated as the total of the DT (24, 29), DT (21, 24), and DT (20, 21) and each of the DTs included in the second total, that is, the DT (24, 29), DT (21, 24), and DT (20, 21).

Furthermore, in this case, the calculation unit 140 identifies the second communication path corresponding to all the DTs used for calculation of the second total, that is, the DT (24, 29), DT (21, 24), and DT (20, 21).

Specifically, the calculation unit 140 identifies each communication path used for calculation of the DT (24, 29), DT (21, 24), and DT (20, 21) and identifies the communication path composed of all the identified communication paths as the second communication path. In this case, the second communication path is the communication path connecting the terminals 20, 21, 24, and 29.

For example, in the ALM tree in FIG. 6, there are plural (eight) leaf terminals corresponding to the terminal 20. In this example, the plural leaf terminals corresponding to the terminal 20 are the terminals 27 to 30 and the terminals 31 to 34.

In other words, in the ALM tree in FIG. 6, the second total is calculated using the above-described process as follows. There are plural communication paths from the terminal 20 to the leaf terminals corresponding to the terminal 20. One of all the communication paths corresponds to the largest total of branch delays between a pair of two terminals on the communication paths. This is the largest value corresponding to the communication path. In this case, the leaf terminals corresponding to the terminal 20 are the terminals 27 to 30 and the terminals 31 to 34.

There is a possibility that not all terminals composing an ALM tree have plural corresponding leaf terminals. This depends on structure of the ALM tree. Assume that the ALM tree in FIG. 6 does not have the terminals at the third to fifth levels other than the terminals 21, 24, and 29 among the terminals 21 to 34, that is, the ALM tree lacks the terminals 23, 27, 28, 30, 22, 25, 25, 31, 32, 33, and 34. In this example, the terminal 20 has an only leaf terminal, the terminal 29. Furthermore, the terminal 20 has an only one corresponding first communication path. Furthermore, the only one first communication path corresponding to the terminal 20 is also a second communication path.

Assume that the ALM tree in FIG. 6 does not have the terminals other than the terminals 24 and 29 among the terminals 23 to 30, that is, the ALM tree lacks the terminals 23, 27, 28, and 30. In this example, the terminal 21 has an only leaf terminal, the terminal 29. In this example, the terminal 21 has an only one corresponding first communication path. Furthermore, the only one first communication path corresponding to the terminal 21 is also a second communication path.

Figure 13A:
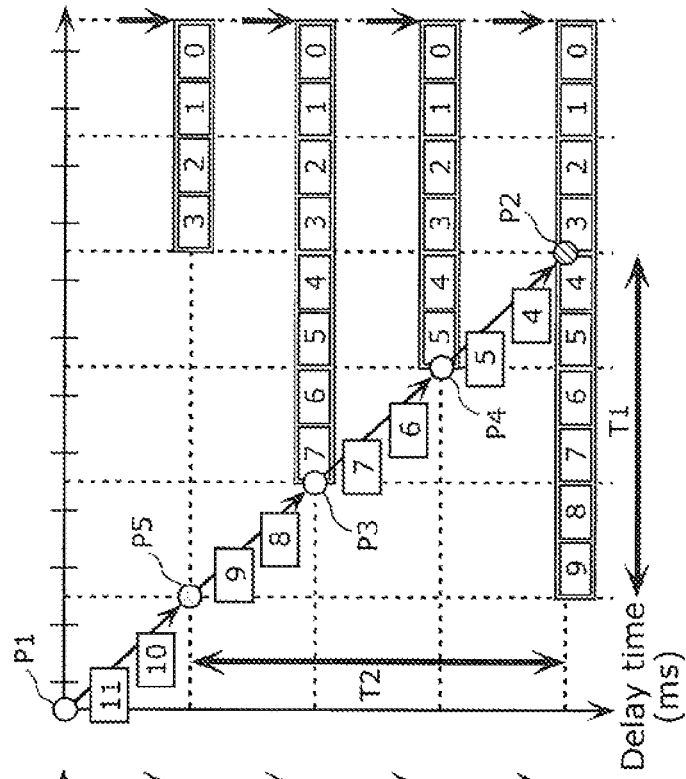
FIG. 13A is a first diagram for illustrating statuses of terminals corresponding to all or part of a second communication path.
Figure 13B:
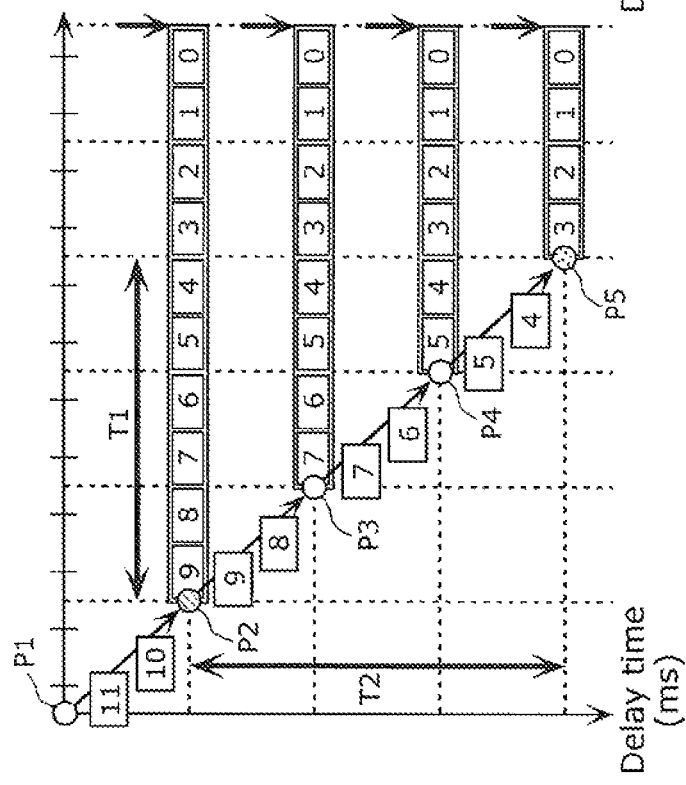
FIG. 13B is a second diagram for illustrating statuses of terminals corresponding to all or part of the second communication path.

FIG. 13A and FIG. 13B illustrate statuses of terminals corresponding to all or part of a second communication path.

FIG. 13A illustrates exemplary statuses of the terminals before the first process is performed.

FIG. 13B illustrates exemplary statuses of the terminals after the first process is performed.

The first process is performed upon transmission of second control data from a terminal P1, which is the root node, to a terminal P5 via terminals P2, P3, and P4 while the terminals are in the statuses illustrated in FIG. 13A. The second control data is, for example, data for instruction for switching a terminal P2 and a terminal P5.

The symbols in FIG. 13A and FIG. 13B have already been described using FIG. 5A and FIG. 5B, and therefore the detailed description thereof is not repeated. The following will describe the symbols in brief. Blocks with sequential numbers 0 to 11 represent stream data packets. In the following, the sequential numbers may be also simply referred to as numbers. Blocks with smaller numbers are older stream data packets.

The terminals P1 to P5 in FIG. 13A and FIG. 13B correspond to all or part of a second communication path. For example, the terminal P1 is the root terminal. The terminal P1 is a terminal at the first level of the ALM tree. In FIG. 13A, the terminals P2 to P5 are at the second to fifth levels, respectively. The zero or more numbers in each horizontal row associated with a terminal represent the sequential numbers of zero or more stream data packets stored in the buffer of the corresponding terminal. For example, the buffer of the terminal P2 illustrated in FIG. 13A stores ten stream data packets numbered 0 to 9. Assume that in FIG. 13A, the terminal P5 is a leaf terminal. It should be noted that the terminal P5 need not be a leaf terminal.

Also assume that the terminal P2 is the terminal 20 (see FIG. 6, etc.) In this example, the second communication path identified using the above-described process is a communication path from the terminal P2 to the terminal P5 (leaf terminal).

Referring to FIG. 12 again, the calculation unit 140 calculates, as a reproduction delay time of the communication terminal including the calculation unit 140 (terminal 20), a total of a second total corresponding to a second communication path from the communication terminal including the calculation unit 140 to its leaf terminal and a predetermined delay time K (S230). The delay time K is a length of time taken to seamlessly reproduce successive stream data packets and also the length of time taken to store the stream data packets in a buffer.

For example, the delay time K is 300 ms. The terminal P5, which is a leaf terminal, has no child terminal, and therefore the reproduction delay time of the terminal P5 equals delay time K.

FIG. 14 illustrates exemplary reproduction delay times each corresponding to a terminal.

In FIG. 14, terminal IDs in the first column identify terminals. For example, a terminal ID in the second row P2 identifies a terminal P2. In FIG. 14, a DT (x, y) indicates a branch delay between a terminal x and a terminal y as described above. For example, a DT (P2, P3) indicates a branch delay between the terminal 2 and the terminal 3. When the terminal P2 is the terminal 20 and the terminal P3 is the terminal 21, the DT (P2, P3) corresponds to a DT (20, 21).

Referring to FIG. 14, a reproduction delay time of the terminal P3 (in the third row) is a total of a DT (P3, P4), a DT (P4, P5), and a delay time K.

Referring to FIG. 12 again, the calculation unit 140 notifies the control unit 150 of the calculated reproduction delay time (S240).

As described above, the reproduction unit 160 starts reproduction of the nth stream data packet at a time point which is later than the storing of the nth stream data packet in the buffer 170 by a delay time K (n is a natural number).

The control unit 150 controls reproduction by the reproduction unit 160 (S250). Specifically, the control unit causes the reproduction unit 160 to start reproduction of the stream data packet at a time point which is later than the predetermined time point by the second total. The second total is a total of all the delay times corresponding to the communication path (the second communication path) from the communication terminal including the obtainment unit 130 to its leaf terminal. The delay times are obtained by the obtainment unit 130. The predetermined time point is a time point which is later than the storing of the stream data packet in the memory unit (buffer 170) by a predetermined length of time (delay time K). The predetermined length of time is a length of time taken to store the stream data packet in the memory unit.

More specifically, the control unit 150 transmits a first instruction to the reproduction unit.

The first instruction is an instruction for starting reproduction of the nth stream data packet at a time point which is later than the storing of the nth stream data packet in the buffer 170 by a reproduction delay time. The reproduction delay time is a total of the second total and the delay time K. In other words, the first instruction is an instruction for starting reproduction of the nth stream data packet at a time point which is later than the storing of the nth stream data packet in the buffer 170 by the second total or longer.

When n=1, upon receiving a first instruction, the reproduction unit 160 starts reproduction of the first stream data packet (stream data packet numbered 0) at a time point which is later than the predetermined time point by the second total or longer.

Here, the condition "later than the predetermined time point by the second total or longer" is not limiting. Alternatively, the control unit 150 may cause the reproduction unit 160 to start reproduction of the stream data packet at a time point which is later than the predetermined time point just by the second total.

This is the third process to be performed by each terminal included in an ALM tree except the root terminal.

With this, it is possible to cause the terminals corresponding to the second communication path to synchronously start reproduction of stream data packets as illustrated in FIG. 13A. In FIG. 13A and FIG. 13B, a period (of time) T1 is the length of time from when the reproduction unit 160 starts reproduction of a stream data packet numbered 4 to when the reproduction unit 160 completes reproduction of the stream data packet numbered 9. A period (of time) T2 is the length of time which it takes for the stream data packet transmitted from a terminal at the second level to arrive at a terminal at the fifth level. Here, the relationship of T2≤T1 is satisfied as a result of the process performed in Step S250.

Assume that the terminal P2 and the terminal P5 are switched in response to deterioration in communications while stream data is being reproduced as illustrated in FIG. 13A (see FIG. 13B). In other words, structure of an ALM tree is changed during reproduction of stream data.

In this case, the terminal P2 relocated to the fifth level receives can receives a stream data packet numbered 10 within a period of time from start of reproduction of a stream data packet numbered 4 to completion of reproduction of a stream data packet numbered 9. In other words, it is possible to prevent the terminal P2 from failing to receive the stream data packet numbered 10 by the time when the terminal P2 completes reproduction of the stream data packet numbered 9. In other words, delay in arrival of a stream data packet can be absorbed.

This thereby enables seamless reproduction of stream data even when there is a change in the structure of an ALM tree during reproduction of the stream data.

Any terminal switched with another terminal among the terminals P2 to P5 in FIG. 13A has an effect similar to the effect of the terminal P2 relocated to the fifth level.

Furthermore, the processes in Embodiment 1 can be performed also in the case where the terminal at the fifth level among the terminals P1 to P5 shown in FIG. 13A and FIG. 13B (for example, the terminal P5 in FIG. 13A) is not a leaf terminal. In other words, the processes in Embodiment 1 can be performed also in the case where there is a terminal at the sixth level in addition to the terminals shown in FIG. 13A and FIG. 13B.

As described above, according to Embodiment 1, the control unit 150 of a terminal among the terminals included in an ALM tree except the root terminal causes the reproduction unit 160 to start reproduction of the stream data packet at a time point which is later than the predetermined time point by the second total or longer.

With this, it is possible to cause the terminals corresponding to the second communication path in the ALM tree to start reproduction of stream data packets at the same time as illustrated in FIG. 13A. This thereby enables seamless reproduction of stream data even when there is a change in the structure of the ALM tree during reproduction of the stream data.

For a specific example, interruption (skipping) during video reproduction, or deterioration in video quality can be prevented. In other words, this increases quality of video and audio reproduced by terminals included in an ALM tree.

The present invention is not limited to the third process in Embodiment 1 in which a second communication path is used. For example, the third process may be performed using a path between two terminals which are most likely to be switched or a randomly selected path.

When a branch delay (network delay) between terminals before the first process is performed and a branch delay (network delay) between the terminals after the first process is performed are not comparable in length, the rate of absorption of delay in arrival of stream data packets may be low. This is the case where, for example, the delay time from the terminal P2 to the terminal P5 before the first process is performed as illustrated in FIG. 13A and the delay time from the terminal P5 to the terminal P2 after the first process is performed as illustrated in FIG. 13B are substantially different.

In this case, the delay time from the terminal P2 to the terminal P5 before the first process is performed is a total of a DT (P2, P3), DT (P3, P4), DT (P4, P5), and K. The delay time from the terminal P5 to the terminal P2 after the first process is performed is a total of DT (P5, P3), DT (P3, P4), DT (P4, P2), and K. Here, for an example for FIG. 13A and FIG. 13B, assume that the DT (P2, P3) is not equal to the DT (P5, P3) and that the DT (P4, P5) is not equal to the DT (P4, P2) for an example.

Each terminal may perform a process in order to prevent such reduction in the rate of absorption of delay in arrival of stream data packets. For example, in the process, the terminal may use a value obtained by adding a branch delay corresponding to each path between terminals and a maximum branch delay between terminals below the terminal.

Alternatively, in the process, the terminal may use a value obtained by adding a branch delay corresponding to each path between terminals and a maximum branch delay between terminals in the ALM tree. Alternatively, in the process, the terminal may use a value obtained by adding a branch delay corresponding to each path between terminals and a certain value α (α≥0).

Variation 1 of Embodiment 1

In Embodiment 1, a terminal is relocated in the first process to a level lower than the level before the first process is performed (for example, terminal P2). In Embodiment 1, the terminal is enabled to seamlessly reproduce stream data. However, a terminal relocated in the first process to a level higher than the level before the first process is performed may fail to seamlessly reproduce stream data. For example, a terminal may be relocated to a lower level at one time and may be relocated to an upper level at another time.

Referring to FIG. 13B, for example, the terminal P5 after the first process is performed receives a stream data packet numbered 10. In this example, the terminal P5 still needs stream data packets numbered 4 to 9. In the following, a stream data packet needed by a terminal is also referred to as a missing stream data packet. In the following, a missing stream data packet is also referred to as a missing packet.

It is possible for the terminal P5 to receive the missing stream data packets again from its new parent terminal (terminal P1). However, when there are so many missing stream data packets as to exceed the data transmission capacity of the terminal P1, it may be impossible for the terminal P15 to receive the missing stream data packets from the terminal P1. For example, the data transmission capacity of the terminal P1 is exceeded when the amount of data to be transmitted from the terminal P1 to the terminal P5 in FIG. 13B reaches the network bandwidth therebetween.

In Variation of Embodiment 1, a terminal receives missing stream data packets from a terminal which has already obtained the missing stream data packets. For example, a terminal receives stream data packets which the terminal misses immediately after relocation in the first process from its parent terminal before the relocation.

The processes according to Embodiment 1 (for example, the third process) are also performed in Variation 1 of Embodiment 1.

The communication terminal in Variation 1 of Embodiment 1 is the communication terminal 100 in FIG. 7.

The transfer unit 110 of the communication terminal 100 in Variation 1 of Embodiment 1 performs the following process. In the process, the transfer unit 110 detects switching of a first terminal located below the communication terminal 100 and a second terminal located above the communication terminal 100 in an ALM tree. Next, upon the detection in the process, the transfer unit 110 changes, from the first terminal to the second terminal, the destination of stream data to be transferred by the multicast unit 120, which is the communication unit.

FIG. 15A and FIG. 156 illustrate processing which is performed in Variation 1 of Embodiment 1 according to the present invention.

FIG. 15A is a simplified FIG. 13A. Terminals P1 to P5 in FIG. 15A correspond to the terminals P1 to P5 in FIG. 13A, respectively.

Data D10 in FIG. 15A corresponds to the stream data packets numbered 4 to 9 in FIG. 13A. In other words, the data D10 includes a plurality of the missing stream data packets. Data D20 corresponds to the stream data packets numbered 10 and 11 (see FIG. 13B).

FIG. 15B is a simplified FIG. 13B.

The following will describe a process for transmitting missing stream data packets immediately after the first process is performed (hereafter also referred to as a fourth process).

Figure 16:
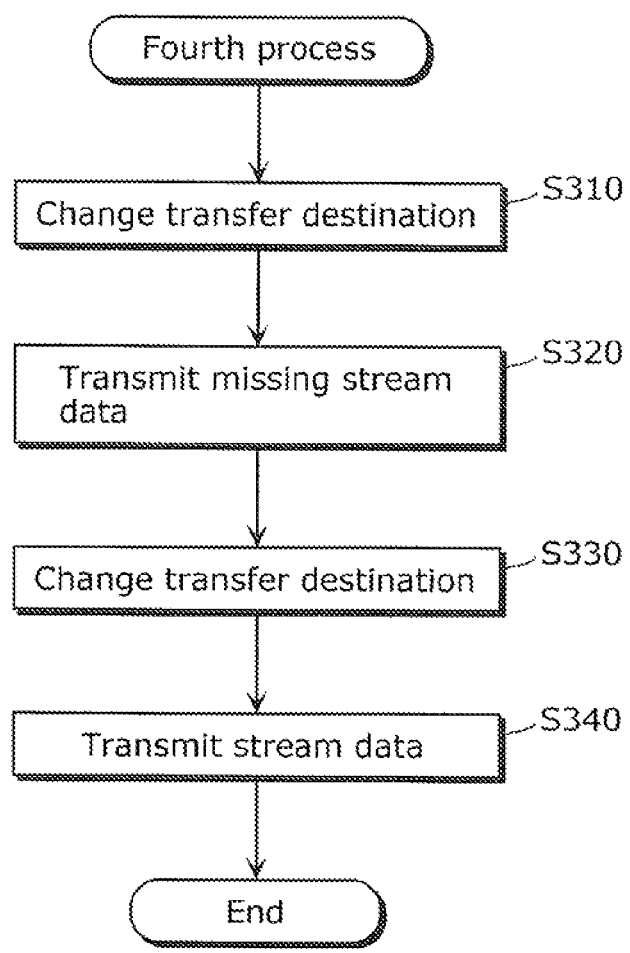
FIG. 16 is a flowchart of the fourth process.

FIG. 16 is a flowchart of the fourth process.

In the following, a terminal relocated by the first process to a level higher than before the first process is performed is also referred to as an elevated terminal.

The fourth process is performed by a terminal which is a parent terminal of an elevated terminal before the elevated terminal is relocated. In the following, the parent terminal is also referred to as an ex-parent terminal.

Assume here that in response to deterioration in communications illustrated in FIG. 13A, the first process is performed upon transmission of second control data from the terminal P1, which is the root terminal, to the terminal P5 via the terminals P2, P3, and P4 in this order. Also assume that the second control data is, for example, data for instruction for switching the terminal P2 and the terminal P5. The second control data notifies the terminals P2 to P5 that the terminal P2 and the terminal P5 are switched.

Then, the terminal P2 and the terminal P5 are switched as described using FIG. 13A (the first process). In this case, the terminal P5 is an elevated terminal. The ex-parent terminal of the elevated terminal is the terminal P4. The fourth terminal is therefore performed by the terminal P4. The terminal P4 has been notified of the switching of the terminal P2 and the terminal P5 by the second control data. Specifically, the terminal P4 has been notified that the terminal P5 is now at the second level. Furthermore, the terminal P4 has information on the stream data packets obtained by the terminal P5 as its child terminal when the terminal P4 receives the second control data, based on a DT (P4, P5) and others. Assume that the DT (P4, P5) is longer than the time which it takes for two successive stream data packets transmitted from the terminal P4 to reach the terminal P5.

In this example, the terminal P4 has information that the terminal P5 has obtained stream data packets numbered 1 to 3 when the stream data packet numbered 5 is the newest stream data packet among the packets obtained by the terminal P4 by the time when the terminal P4 received the second control data. Then, the terminal P2 and the terminal P5 are switched according to the second control data so that the terminal P5 is relocated to the second level. Assume that the terminal P4 performs the fourth process for an example.

The following will describe the fourth process using FIG. 13B, FIG. 15A, FIG. 15B, and FIG. 16.

First, upon receiving the second control data, the transfer unit 110 of the terminal P4 detects switching of the terminal P2 and the terminal P5. Next, the transfer unit 110 of the terminal P4 changes, from the terminal P2 to the terminal P5, the destination of stream data packets to be transferred (transmitted) by the multicast unit 120 (S310).

Specifically, in this process, the transfer unit 110 detects switching of a first terminal located below the communication terminal 100 and a second terminal located above the communication terminal 100 in the ALM tree, that is, switching of the terminal P2 and the terminal P5. Next, upon the detection in the process, the transfer unit 110 changes, from the first terminal to the second terminal, the destination of stream data to be transferred by the multicast unit 120, which is the communication unit.

Next, the transfer unit 110 controls the multicast unit 120 so that the multicast unit 120 transmits missing stream data packets numbered 4 to 9, which correspond to the data D10, to the terminal P5. The multicast unit 120 therefore transmits the missing stream data packets numbered 4 to 9, which correspond to the data D10, to the terminal P5 (S320).

In other words, in Step S320, when the transfer unit 110 detects switching of the first terminal and the second terminal, the communication unit (the multicast unit 120) transmits, to the first terminal, a stream data packet which has already been received by the second terminal and follows the newest one of the stream data packets already received by the first terminal.

After the missing stream data packets re transmitted, the transfer unit 110 changes, from the terminal P5 to the terminal P2, the destination of stream data packets to be transferred (transmitted) by the multicast unit 120 (S330). Then, the multicast unit 120 transmits stream data packets numbered 10 and 11, which correspond to the data D20, to the terminal P2 (S340).

In other words, in the process in Step S340, the communication unit (the multicast unit 120) transmits new stream data packets to the second terminal after transmitting the stream data packet following the newest stream data packet of the first terminal.

The terminal P4 transmits no stream data packet its child terminal (terminal P2) while transmitting missing stream data packets. However, this does not cause any problem (see FIG. 13B) because the terminal P2 has been relocated to a level below the terminal P4 with the stream data packets numbered 4 to 9 stored in the buffer 170 of the terminal P2.

As describe above, according to Variation 1 of Embodiment 1, when the first terminal and the second terminal are switched, the communication terminal 100 transmits, to the first terminal, the stream data packet which has already been received by the second terminal and follows the newest one of the stream data packets received by the first terminal.

After transmitting the net stream data packet to the first terminal, the communication terminal 100 transmits a new stream data packet to the second terminal. Here, the first terminal is located below the communication terminal 100, and the second terminal is located above the communication terminal 100.

With this, the stream data packet which follows the newest stream data packet can be delivered to the first terminal after relocation with no additional delay, even when a large amount of stream data is transmitted from the root terminal of the ALM tree. As a result, it is possible to prevent interruption in reproduction of stream data by the first terminal relocated to above the communication terminal 100.

In other words, it is possible for the first terminal relocated to above the communication terminal 100 to seamlessly reproduce stream data.

Variation 2 of Embodiment 1

When a dynamic change occurs to a delay time between terminals in an ALM tree or to an ALM tree, a change may occur also to one or more of second totals corresponding to second communication paths included in the ALM tree.

In Variation 2 of Embodiment 1, when a change in a second total corresponding to a second communication path corresponding to a terminal is detected, the following adjustment is performed in addition to the processes performed in Variation 1 of Embodiment 1 in order to flexibly respond to the change in the second total. The adjustment is performed on reproduction delay time of a communication terminal depending on the charge in the second total.

Figure 17:
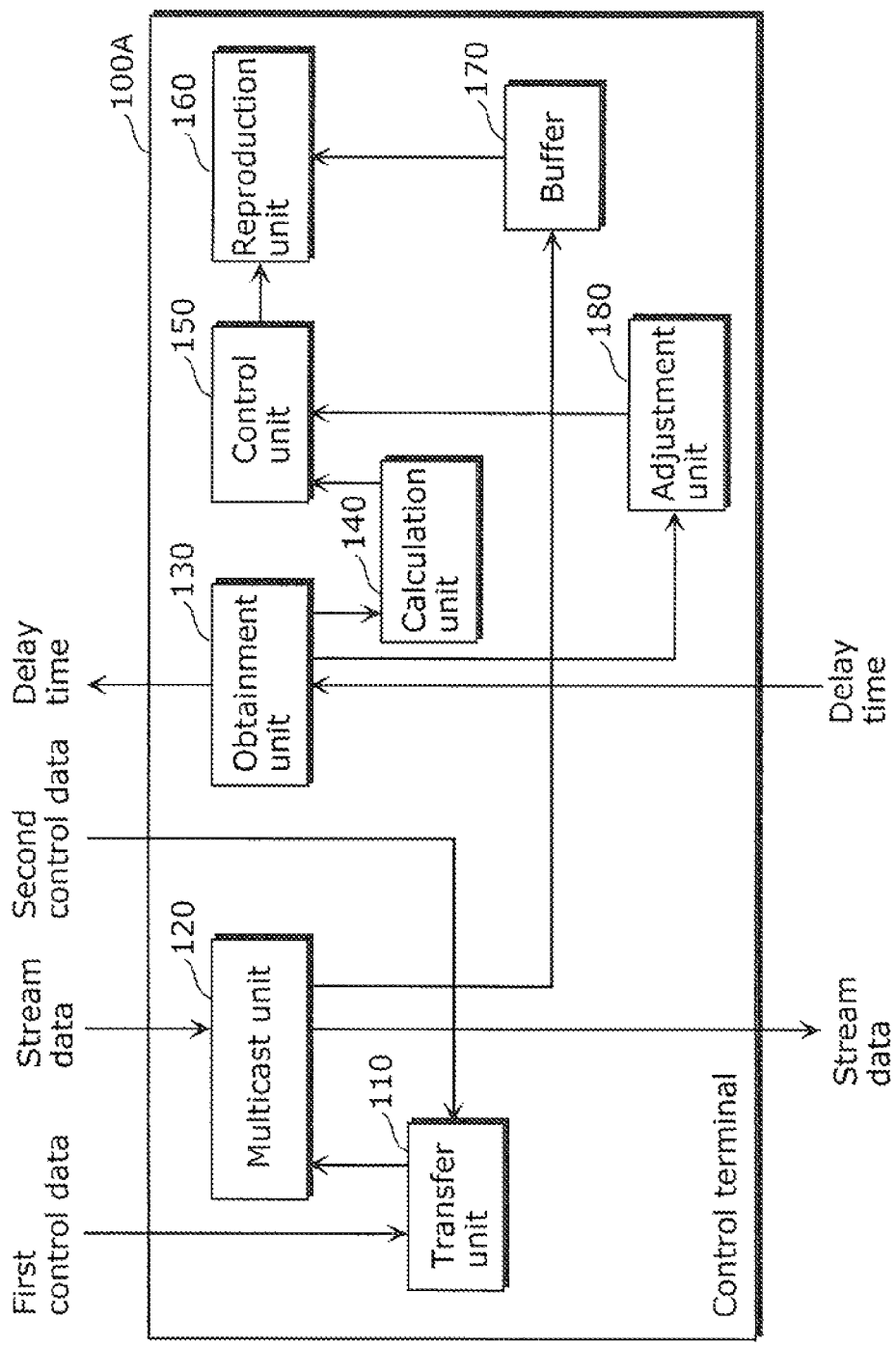
FIG. 17 illustrates a configuration of a communication terminal according to Variation 2 of Embodiment 1 of the present invention.

FIG. 17 illustrates a configuration of a communication terminal 100A according to Variation 2 of Embodiment 1 of the present invention. The communication terminal 100A is a terminal which is included in an ALM tree but is neither the root terminal nor the leaf terminals of the ALM tree.

As illustrated in FIG. 17, the communication terminal 100A and the communication terminal 100 in FIG. 7 are different in that the communication terminal 100A further includes an adjustment unit 180. The configuration of the communication terminal 100A is identical to that of the communication terminal 100 except the adjustment unit, and detailed description thereof is not repeated.

In Variation 2 of Embodiment 1, each terminal which is neither the root terminal nor the leaf terminals in an ALM tree, that is, the communication terminal 100A also performs the second process as with the communication terminal in Embodiment 1.

Furthermore, the communication terminal 100A, which is neither the root terminal nor the leaf terminals in an ALM tree, performs the third process illustrated in FIG. 12 at predetermined intervals independently of the other processes as with the communication terminal in Embodiment 1. The predetermined intervals have a length of one minute for an example.

In the third process, the obtainment unit 130 of each communication terminal 100A transmits the second total calculated in the process in Step S210 and all branch delays DT used for calculation of the second total also to the adjustment unit 180. The adjustment unit 180 of each terminal is thereby notified of the second total corresponding to the second communication path corresponding to the terminal on a continuous basis.

When a change occurs to the second total, the adjustment unit 180 of each terminal transmits, to the control unit 150, an instruction for changing a reproduction time of the nth stream data packet depending on the second total after the changing.

The following will describe a process which is performed when a second total changes (the process is hereinafter also referred to as a fifth process). The fifth process is performed independently of the other processes.

FIG. 18A and FIG. 18B illustrate an example of the fifth process.

FIG. 18A is a simplified FIG. 13A. FIG. 18A illustrates, as an example, statuses of terminals which are at the first to fourth level of the ALM tree illustrated in FIG. 6 and correspond to all or part of a second communication path in the ALM tree. Terminals P1 to P4 in FIG. 18A correspond to the terminals P1 to P4 in FIG. 13A, respectively.

Figure 19:
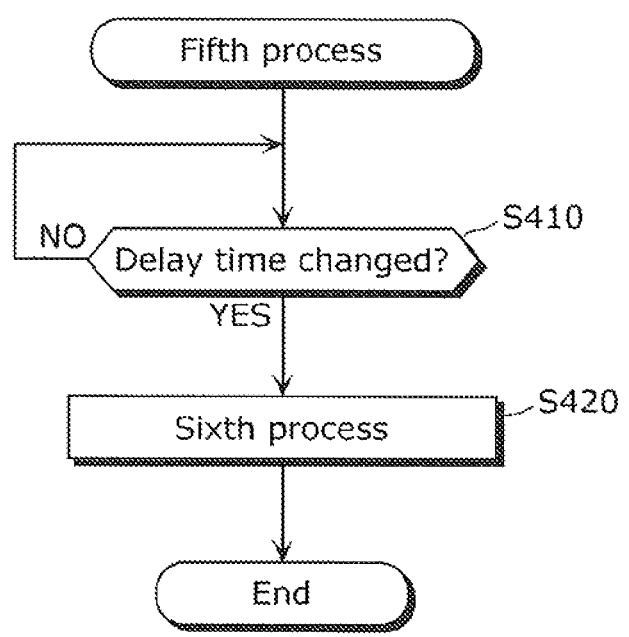
FIG. 19 is a flowchart of the fifth process.

FIG. 19 is a flowchart of the fifth process.

Assume that the terminal P2 performs the fifth process for an example. Also assume that the path from the terminal P2 to the terminal P4 in FIG. 18A is a second communication path.

When a second total changes (S410, YES), that is, when a delay time changes, the adjustment unit 180 of the terminal P2 performs a sixth process to change reproduction speed of stream data (S420).

In the sixth process, the adjustment unit 180 and the control unit 150 perform a process appropriate for the second total after the changing.

Assume here that a new terminal P5 is added to a level below the terminal P4 (leaf terminal in FIG. 18A) as illustrated in FIG. 18B. In this example, the terminal P5 is a new leaf terminal. Also assume that the path from the terminal P2 to the terminal P5 in FIG. 18B is a second communication path. For example, the terminal P5 transmits blank messages to the terminal P4 at predetermined intervals as in Embodiment 1. Next, each of the terminals P3 and P4 performs the second process as in Embodiment 1.

Then, the adjustment unit 180 of the terminal P2 detects increase in the second total. Assume that the second total has increased by 100 milliseconds for an example.

In this example, the adjustment unit 180 transmits a second instruction to the control unit 150. The second instruction is an instruction for changing the reproduction time of the stream data packet following the stream data packet which is currently being reproduced by the reproduction unit 160. The second instruction also indicates a new reproduction time to which the reproduction time is changed. The new reproduction time corresponds to the start time of the stream data packet following the stream data packet which is currently being reproduced.

The new time is a time which the adjustment unit 180 obtains by changing the original reproduction time before the change in the second total. For example, when the second total has increased by 100 milliseconds, the new reproduction time is obtained by adding 100 milliseconds to the original reproduction time. For example, when the second total has decreased by 100 milliseconds, the new reproduction time is obtained by adding −100 milliseconds to the original reproduction time.

In other words, when the delay time (the second total) of a terminal below the communication terminal including the adjustment unit 180 changes, the adjustment unit 180 adjusts the reproduction time of the stream data packet following the stream data packet which is currently being reproduced depending the delay time after the changing.

Upon receiving the second instruction, the control unit 150 causes the reproduction unit 160 to reproduce the stream data packet following the stream data packet currently being reproduced at the new reproduction time.

Specifically, the control unit 150 changes the reproduction speed of the stream data packet currently being reproduced depending on a time obtained by subtracting the original reproduction time from the new reproduction time (the obtained time is hereinafter also referred to as a difference time). A difference time having a positive value indicates increase in a second total. A difference time having a negative value indicates decrease in a second total.

For example, when a difference time has a positive value, the control unit causes the reproduction unit 160 to slow, over the difference time, reproduction of a stream data packet being reproduced in order to avoid troubles in reproduction of the following stream data packet due to the difference time. Examples of the troubles in reproduction of the following stream data packet due to the difference time include a temporary stop and frame-skipping in reproduction of stream data.

For example, when a difference time has a negative value, the control of the control unit 150 causes the reproduction unit 160 to increase, over the difference time, reproduction speed of a stream data packet being reproduced in order to avoid troubles in reproduction of the following stream data packet due to the difference time.

For example, when the difference time is 100 milliseconds, the control unit 150 controls the reproduction unit 160 so that the reproduction unit reproduces stream data at a 0.9-time speed for 100 milliseconds.

For example, when the difference time is −100 milliseconds, the control unit 150 controls the reproduction unit 160 so that the reproduction unit reproduces stream data at a 1.1-time speed for 100 milliseconds.

The fifth process may be performed by a terminal other than the terminal P2 for example, the terminal P3 or P4.

The process of increasing the reproduction speed of a stream data packet being reproduced may not be performed when a difference time has a negative value, that is, when a second total decreases.

The fifth process is applicable not only to the case where there is an increase in the number of terminals but also to the case where a terminal disappears from an ALM tree when, for example, the terminal is turned off. The fifth process is also applicable to the case where there is no change in the number of terminals but there is a change in a second total because of increase in network load on a communication path between two terminals, for example.

As described above, according to Variation 2 of Embodiment 1, flexible response is possible even when a terminal lower than a communication terminal disappears or a terminal is added to a level below a communication terminal while a first stream data packet is being reproduced. As a result, stream data can be seamlessly reproduced.

It should be noted that the fourth process is also performed in Variation 2 of Embodiment 1 as in Variation 1 of Embodiment 1.

Embodiment 2

With a recording medium such as a flexible disk on which a program for communication control method described in the above embodiment and variations thereof is recorded, it is possible to perform the embodiment or the variations thereof on an independent computer system with ease.

Figure 20A:
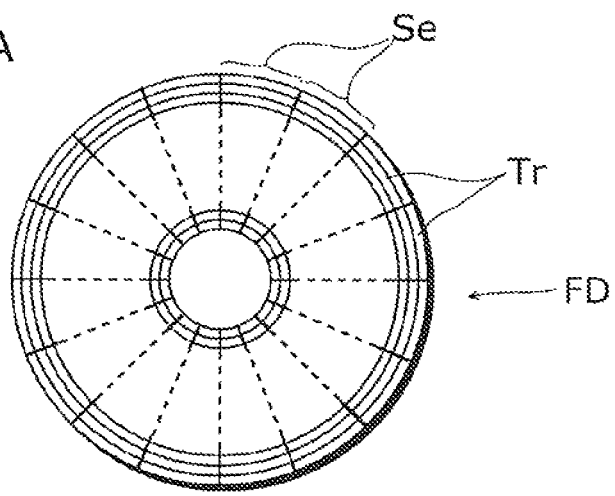
FIG. 20A illustrates an example of low-level format of a recording medium according to Embodiment 2 of the present invention.
Figure 20B:
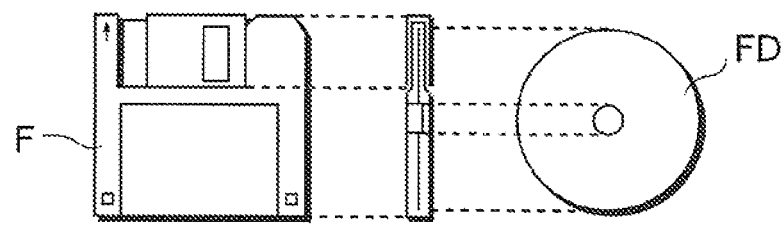
FIG. 20B illustrates a configuration of the recording medium according to Embodiment 2 of the present invention.
Figure 20C:
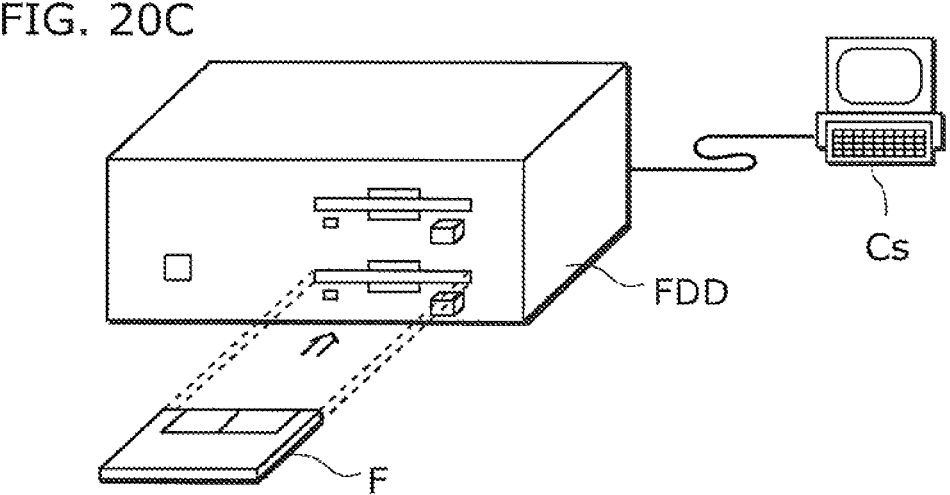
FIG. 20C illustrates a configuration of a computer system according to Embodiment 2 of the present invention.

FIG. 20A to FIG. 20C illustrate a case where a computer system performs the communication control method according to the embodiment and the variations thereof using a program recorded on a recording medium such as a flexible disk.

FIG. 20A illustrates an example low-level format of a flexible disk which is a main part of a recording medium. FIG. 20B illustrates a front view and a sectional view of a flexible disk FD and its case F. The flexible disk FD is encased in the case F and has a surface on which a plurality of tracks Tr is formed concentrically from the outermost circumference toward the innermost circumference. Each track is radially divided into 16 sectors Se. In the flexible disk FD storing the program, a region on the flexible disk FD is allocated to the program and the program is recorded in the region.

FIG. 20C illustrates a configuration for record and reproduction of the program on the flexible disk FD. The program for the communication control method is recorded on the flexible disk FD from a computer system Cs via a flexible disk drive FDD. A communication control method is implemented on the computer system Cs using the program on the flexible disk FD by reading the program from the flexible disk FD using the flexible disk drive FDD and transferring the program to the computer system Cs.

An optical disc also can be used as a recording medium instead of the flexible disk in the above description. Furthermore, the recording medium is not limited to them. Any medium, such as an integrated circuit (IC) card or a read-only-memory (ROM) cassette, may be employed instead also in the same manner as described for the flexible disk as long as the program can be recorded thereto.

(Function Block Diagram)

Figure 21:
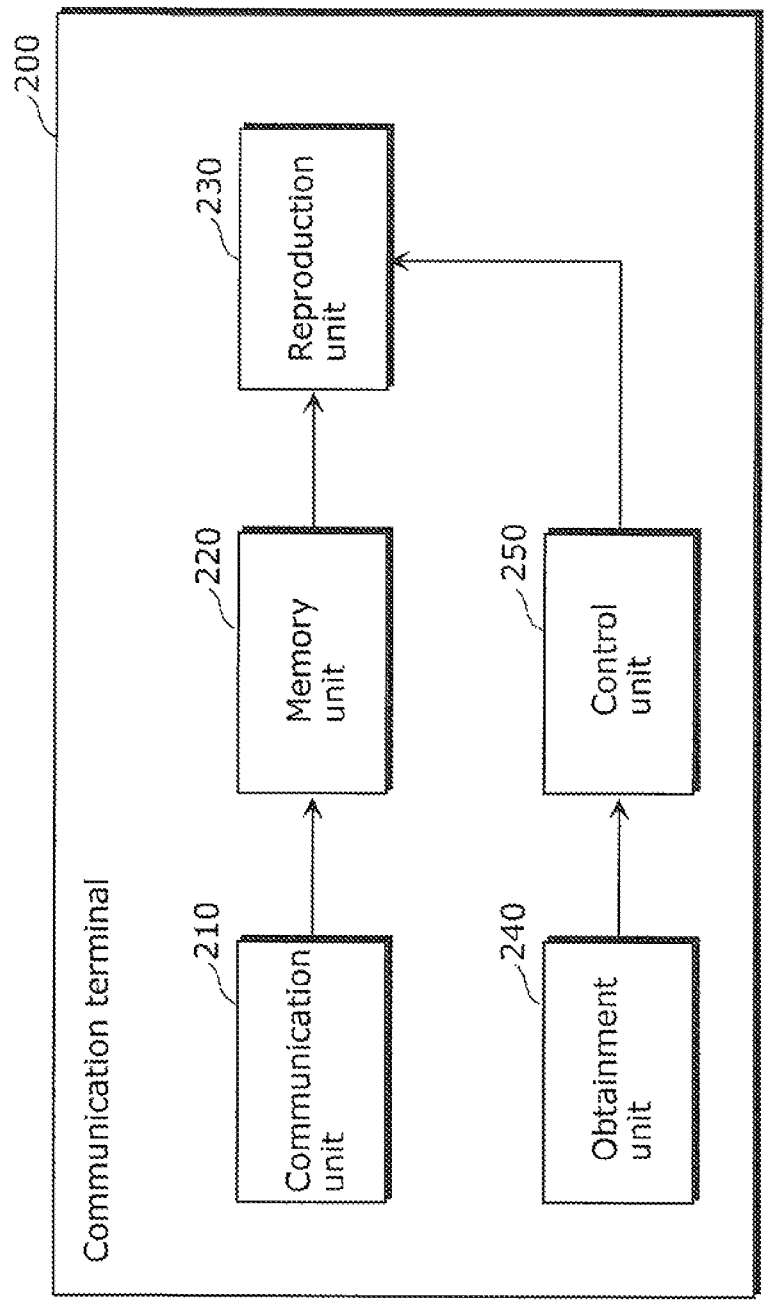
FIG. 21 is a block diagram illustrating a function configuration characteristic of a communication terminal.

FIG. 21 is a block diagram illustrating a function configuration characteristic of the communication terminal 200. The communication terminal 200 corresponds to either the communication terminal 100 or 100A. In other words, FIG. 21 is a block diagram illustrating one of functionalities of either of the communication terminal 100 or the communication terminal 100A. The functionality is a main one related to the present invention.

The communication terminal 200 is any one of the terminals included in an application layer multicast (ALM) tree having a structure which is dynamically changeable during reproduction of stream data.

In terms of functionalities, the communication terminal 200 includes a communication unit 210, a memory unit 220, a reproduction unit 130, an obtainment unit 140, and a control unit 250.

The communication unit 210 receives stream data packets in sequence from a terminal above the communication terminal 200 in the ALM tree. The communication unit 210 corresponds to the multicast unit 120 in FIG. 7 or FIG. 17.

In other words, the memory unit 220 stores the stream data packets received in sequence by the communication unit 210. The memory unit 220 corresponds to the buffer 170 in FIG. 7 or FIG. 17.

The reproduction unit 230 reproduces the stream data packets in sequence stored in the buffer 220 with predetermined timing. The reproduction unit 230 corresponds to the reproduction unit 160 in FIG. 7 or FIG. 17.

The communication unit 210 also transmits the received stream data packets to terminals below the communication terminal 200 in the ALM tree.

The obtainment unit 240 obtains a delay time in data communication between terminals below the communication terminal 200 in the ALM tree. The obtainment unit 240 corresponds to the obtainment unit 130 in FIG. 7 or FIG. 17.

The control unit 250 controls the reproduction unit 230 so that the reproduction unit 230 starts reproduction of the stream data packets at a time point which is later than the predetermined time point by a predetermined length of time. The predetermined length of time is longer than or equal to a total of all delay times corresponding to the communication path from the communication terminal 200 to its leaf terminal obtained by the obtainment unit. The control unit 250 corresponds to the control unit 150 in FIG. 7 or FIG. 17.

All or part of the communication unit 210, the memory unit 220, the reproduction unit 230, the obtainment unit 240, and the control unit 250 included in the communication terminal 200 may be implemented in hardware such as a large scale integration (LSI). Furthermore, all or part of the communication unit 210, the memory unit 220, the reproduction unit 230, the obtainment unit 240, and the control unit 250 may be implemented as a module of a program to be executed by a processor such as a CPU.

The communication terminal 200 may be implemented as an integrated circuit.

(Other Variations)

The communication terminal and communication control method according to the present invention has been described above based on the embodiment, which does not limit the present invention. The present invention also includes variations of the embodiment conceived by those skilled in the art unless they depart from the spirit and scope of the present invention.

The numerical values in the above embodiment are exemplary ones used to specifically explain the present invention. In other words, the present invention is lot limited to the numerical values used in the embodiment.

The communication control method according to the present invention corresponds to the third process illustrated in FIG. 12, for example. The communication control method according to the present invention also corresponds to the third process illustrated in FIG. 12, the fourth process illustrated in FIG. 15, and the fifth process illustrated in FIG. 19 which are performed independently of each other, for example. The communication control method according to the present invention need not included all the steps corresponding to the steps in FIG. 12, FIG. 16, or FIG. 19. In other words, the communication control method according to the present invention may include only the steps necessary for producing the advantageous effect of the present invention. For example, the third process in FIG. 12 may include only Steps S210 and S250.

The above-described order of performing the steps in the communication control method is merely an example to specifically explain the present invention, and the process may be performed in an order other than the above-described order. Furthermore, steps in the communication control method may be independently performed in parallel.

For example, in the third process of the communication control method illustrated in FIG. 12, the process in Step S210 is performed independently of Steps S220 to S250 and may be performed in parallel with each other.

Part or all of the constituent elements of the communication terminal 100 or 100A may be implemented as an integrated circuit, typically a large-scale integration (LSI). Each of the constituent elements may be integrated into a separate single chip, or optionally some or all of the constituent elements may be integrated into a single chip.

Although mentioned here is an LSI, it may be referred to as an IC, a system LSI, a super LSI or an ultra LSI, depending on the degree of integration.

The method of forming integrated circuitry is not limited to use of such LSIs. Dedicated circuitry or a general-purpose processor may be used instead. Also applicable is a field programmable gate array (FPGA), which allows post-manufacture programming, or a reconfigurable processor LSI, which allows post-manufacture reconfiguration of connection and setting of circuit cells therein.

When a new technique of integration circuit which replaces the LSI comes out as a result of advance in semiconductor technology or another deviational technology, the batch of functions may be integrated using the new technique as a matter of course. The adaptation of biotechnology or the like is possible.

The example disclosed above should not be considered as being limiting but should be considered as a mere example in all aspects. The scope of the present invention is defined not by the description above but by the claims, and is intended to include any modification within a sense and scope equivalent to the claims.

INDUSTRIAL APPLICABILITY

The present invention is applicable to, for example, video distribution systems and remote lecture systems with which an ALM technique is used for increasing quality of video and audio.

REFERENCE SIGNS LIST

D10 Data
11, 12, 13, 14, 15, 16, 17, P1, P2, P3, P4, P5, R10 Terminal
100, 100A, 200 Communication terminal
110 Transfer unit
120 Multicast unit
130, 240 Obtainment unit
140 Calculation unit
150, 250 Control unit
160, 230 Reproduction unit
170 Buffer
180 Adjustment unit
210 Communication unit
220 Memory unit

The invention claimed is:

1. A communication terminal which is one of terminals included in an application layer multicast (ALM) tree having a structure dynamically changeable during reproduction of stream data packets, the communication terminal comprising:

a processor; and a non-transitory memory having stored thereon executable instructions, which when executed by the processor, cause the processor to perform:

receiving stream data packets in sequence from a second terminal located above the communication terminal in the ALM tree and transmitting the received stream data packets to a first terminal located below the communication terminal in the ALM tree;

storing the received stream data packets;

reproducing the stored stream data packets in sequence;

obtaining a delay time in data communication between terminals located below the communication terminal in the ALM tree;

causing reproduction of each of the stream data packets to be started at a time point which is later than the time at which the stream data packets are stored by a predetermined length of time that is longer than or equal to a total of the obtained delay time corresponding to a communication path from the communication terminal to a leaf terminal corresponding to the communication terminal;

upon receipt of notification that the first terminal and the second terminal in the ALM tree are to be switched, (a) transmitting, to the first terminal, a stream data packet which has already been received by the second terminal before the switch and has not been received by the first terminal before the switch, (b) after transmitting, to the first terminal, the stream data packet which has already been received by the second terminal before the switch and has not been received by the first terminal before the switch, changing a destination of a stream data packet from the first terminal to the second terminal, and transmitting, to the second terminal, a stream data packet newly received from the first terminal after the change;

measuring a delay time between the communication terminal and a third terminal which is a child terminal of the communication terminal in the ALM tree, and transmitting the measured delay time to a parent terminal of the communication terminal; and receiving, from the third terminal, a delay time between the third terminal and a fourth terminal which is a child terminal of the third terminal, and transmitting the received delay time to the parent terminal of the communication terminal, the delay time between the third terminal and the fourth terminal being measured by the third terminal.

2. The communication terminal according to claim 1, wherein there is a plurality of the leaf terminals corresponding to the communication terminal in the ALM tree, and the total is a largest one of totals each of which is a total of the delay time corresponding to a different one of communication paths from the communication terminal to the leaf terminals.

3. The communication terminal according to claim 1, wherein when executed, the executable instructions further cause the processor to perform adjusting, when the delay time between the terminals below the communication terminal changes, a reproduction time point of the stream data packet which follows the stream data packet currently being reproduced depending on a difference time.

4. The communication terminal according to claim 1, wherein the stream data includes at least one of video data and audio data.

5. A communication control method which is performed by a communication terminal that is one of terminals included in an application layer multicast (ALM) tree having a structure dynamically changeable during reproduction of stream data packets, wherein the communication terminal (i) receives stream data packets in sequence from a second terminal located above the communication terminal in the ALM tree and transmits the received stream data packets to a first terminal located below the communication terminal in the ALM tree, (ii) stores the received stream data packets, and (iii) reproduces the stored stream data packets, the communication control method comprising:

obtaining a delay time in data communication between terminals located below the communication terminal in the ALM tree;

causing the communication terminal to start reproduction of each of the stream data packets at a time point which is later than the time at which the stream data packets are stored by a predetermined length of time that is longer than or equal to a total of the obtained delay time corresponding to the communication path from the communication terminal to a leaf terminal corresponding to the communication terminal;

upon receipt of notification that the first terminal and the second terminal in the ALM tree are to be switched, (a) transmitting, to the first terminal, a stream data packet which has already been received by the second terminal before the switch and has not been received by the first terminal before the switch, (b) after transmitting, to the first terminal, the stream data packet which has already been received by the second terminal before the switch and has not been received by the first terminal before the switch, changing a destination of a stream data packet from the first terminal to the second terminal, and transmitting, to the second terminal, a stream data packet newly received from the first terminal after the change;

measuring a delay time between the communication terminal and a third terminal which is a child terminal of the communication terminal in the ALM tree, and transmitting the measured delay time to a parent terminal of the communication terminal; and receiving, from the third terminal, a delay time between the third terminal and a fourth terminal which is a child terminal of the third terminal, and transmitting the received delay time to the parent terminal of the communication terminal, the delay time between the third terminal and the fourth terminal being measured by the third terminal.

6. A non-transitory computer-readable recording medium for use in a computer, the recording medium having a computer program recorded thereon, the program being executed by a communication terminal that is one of terminals included in an application layer multicast (ALM) tree having a structure dynamically changeable during reproduction of stream data packets, wherein the communication terminal (i) receives stream data packets in sequence from a second terminal located above the communication terminal in the ALM tree and transmits the received stream data packets to a first terminal located below the communication terminal in the ALM tree, (ii) stores the received stream data packets, and (iii) reproduces the stored stream data packets, the program, when executed, causing a computer to perform:

obtaining a delay time in data communication between terminals located below the communication terminal in the ALM tree;

causing the communication terminal to start reproduction of each of the stream data packets at a time point which is later than the time at which the stream data packets are stored by a predetermined length of time that is longer than or equal to a total of the obtained delay time corresponding to the communication path from the communication terminal to a leaf terminal corresponding to the communication terminal;

upon receipt of notification that the first terminal and the second terminal in the ALM tree are to be switched, (a) transmitting, to the first terminal, a stream data packet which has already been received by the second terminal before the switch and has not been received by the first terminal before the switch, (b) after transmitting, to the first terminal, the stream data packet which has already been received by the second terminal before the switch and has not been received by the first terminal before the switch, changing a destination of a stream data packet from the first terminal to the second terminal, and transmitting, to the second terminal, a stream data packet newly received from the first terminal after the change;

measuring a delay time between the communication terminal and a third terminal which is a child terminal of the communication terminal in the ALM tree, and transmitting the measured delay time to a parent terminal of the communication terminal; and receiving, from the third terminal, a delay time between the third terminal and a fourth terminal which is a child terminal of the third terminal, and transmitting the received delay time to the parent terminal of the communication terminal, the delay time between the third terminal and the fourth terminal being measured by the third terminal.

* * * * *